US011692634B2

(12) United States Patent
Domingo et al.

(10) Patent No.: US 11,692,634 B2
(45) Date of Patent: *Jul. 4, 2023

(54) BYPASS VALVE ASSEMBLY WITH INTEGRATED FLOW CONTROL VALVE

(71) Applicant: Marshall Excelsior Co., Marshall, MI (US)

(72) Inventors: Franco J. Domingo, Marshall, MI (US); Frederick W. Blanchard, Caldwell, ID (US); Alex L. Hoffman, Bellevue, MI (US)

(73) Assignee: Marshall Excelsior Co., Marshall, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,963

(22) Filed: Nov. 16, 2021

(65) Prior Publication Data
US 2022/0074507 A1 Mar. 10, 2022

Related U.S. Application Data

(63) Continuation of application No. 16/266,450, filed on Feb. 4, 2019, now Pat. No. 11,209,090.

(60) Provisional application No. 62/637,662, filed on Mar. 2, 2018.

(51) Int. Cl.
F16K 11/02 (2006.01)
(52) U.S. Cl.
CPC .................................. F16K 11/02 (2013.01)

(58) Field of Classification Search
CPC .......... F16K 11/02; F16K 17/048; F16K 1/20; F16K 11/105; F16K 5/0407
See application file for complete search history.

(56) References Cited

U.S. PATENT DOCUMENTS

| | | | |
|---|---|---|---|
| 4,687,016 | A | 8/1987 | Takahashi |
| 5,271,371 | A | 12/1993 | Meints et al. |
| 5,437,307 | A | 8/1995 | Cianfrocca, II |
| 5,595,209 | A | 1/1997 | Atkinson et al. |
| 5,623,907 | A | 4/1997 | Cotton et al. |
| 5,842,500 | A | 12/1998 | Rockwood et al. |
| 6,830,439 | B2 | 12/2004 | Stephens |
| 7,509,972 | B2 | 3/2009 | Nesbitt |
| 11,209,090 | B2 * | 12/2021 | Domingo .............. F16K 11/105 |

(Continued)

FOREIGN PATENT DOCUMENTS

CA 2 984 489 A1 11/2016

Primary Examiner — P. Macade Nichols
(74) Attorney, Agent, or Firm — Howard & Howard Attorneys PLLC

(57) ABSTRACT

A bypass valve assembly includes a housing having an inlet, an outlet, and a flow passageway to allow flow of a liquid from the inlet to the outlet and a valve seat disposed about the flow passageway between the inlet and the outlet. A movable poppet is disposed in the housing to engage the valve seat in a closed position and to disengage the valve seat in an open position when pressure of the liquid in the flow passageway exceeds a preset value to allow flow of the liquid through the flow passageway. A rotatable flow control valve is disposed in the housing between the inlet and the outlet. An actuator is coupled to the flow control valve to actuate and move the flow control valve to control flow of the liquid between the inlet and the outlet when the poppet is engaged with the valve seat.

19 Claims, 18 Drawing Sheets

(56) References Cited

U.S. PATENT DOCUMENTS

| | | |
|---|---|---|
| 2002/0189679 A1 | 12/2002 | Avis et al. |
| 2010/0313971 A1 | 12/2010 | Moore et al. |
| 2013/0019958 A1* | 1/2013 | Miyazoe ............ F15B 13/0402 |
| | | 137/115.1 |
| 2013/0287600 A1 | 10/2013 | Elliot et al. |
| 2014/0103240 A1 | 4/2014 | Glime, III et al. |

* cited by examiner

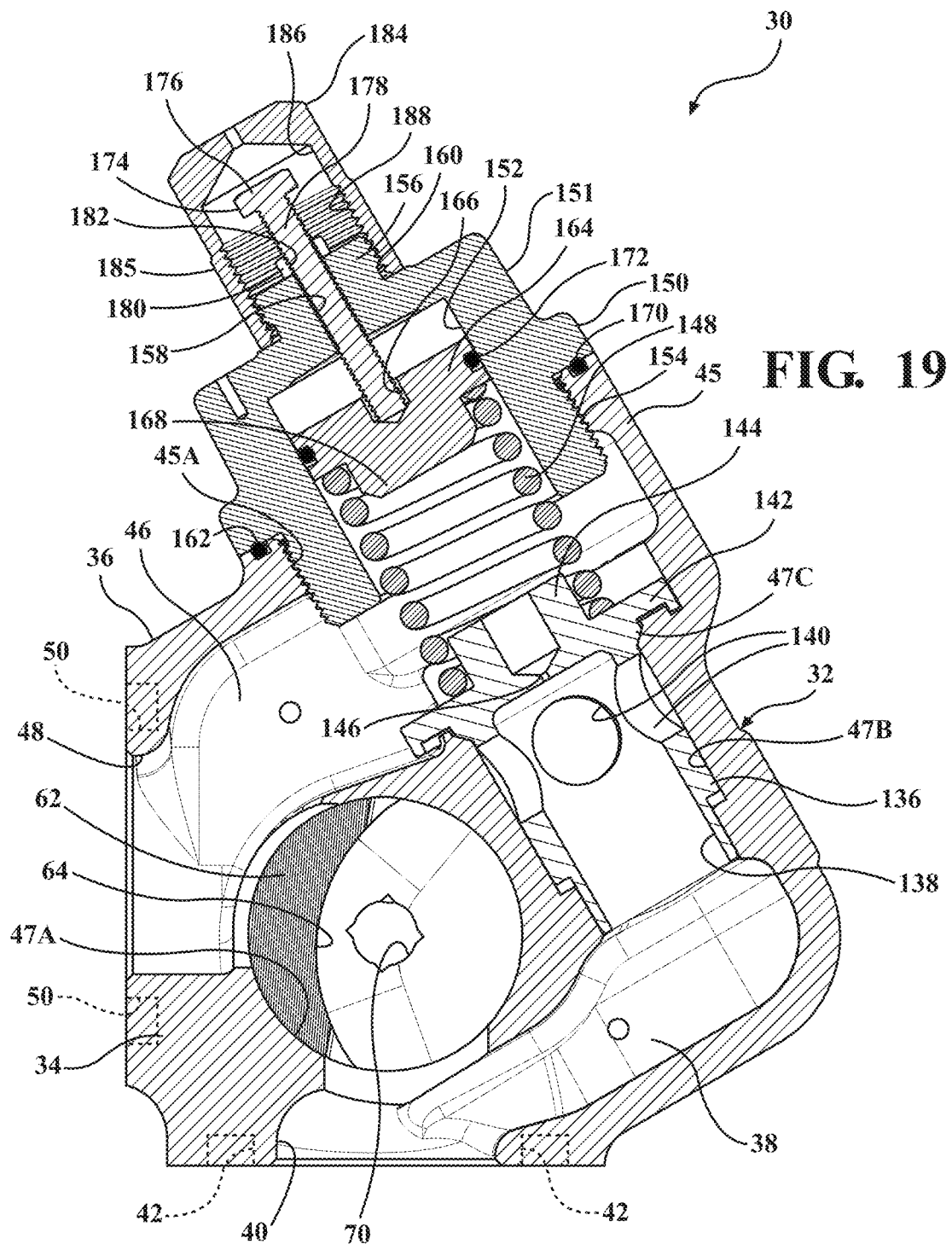

BYPASS VALVE ASSEMBLY WITH INTEGRATED FLOW CONTROL VALVE

CROSS-REFERENCE TO RELATED APPLICATION(S)

The present application is a continuation of U.S. patent application Ser. No. 16/266,450, filed Feb. 4, 2019, which claims priority to and all the benefits of U.S. Provisional Patent Application Ser. No. 62/637,662, filed Mar. 2, 2018, the disclosures of which are hereby expressly incorporated by reference in their entirety.

TECHNICAL FIELD

The present disclosure relates generally to bypass valves and, more particularly to, a bypass valve assembly with an integrated flow control valve for liquid propane and other fuel.

DESCRIPTION OF THE RELATED ART

Liquid Propane (LP) and other fuel delivery trucks are often equipped with a bypass valve that directs excess pump output of liquid product back into a tank to limit outlet pressure to a preset value, typically 125 PSIG differential for LP-gas. As an example, if a hose end valve is closed while a pump is running during a delivery, the outlet pressure would build up to a set point of the bypass valve, causing it to open and divert flow of the product back to the tank.

LP delivery trucks are required to "self-load" in the event of a power loss at a bulk storage facility as well as to evacuate domestic residential tanks when service is terminated, but product remains in the residential tank. This is accomplished by the addition of a "loop line" consisting of piping and valves suitable to allow full pump output of product to flow back into the tank, creating a reduced pressure at an inlet of the pump that is capable of drawing product from the bulk storage tank or the residential tank.

LP delivery trucks are used to deliver product to tanks and cylinders ranging in size from eight (8) gallon forklift cylinders through one thousand (1,000) gallon or larger domestic or agricultural tanks. A pump large enough to have a maximum transfer rate suitable to fill a one thousand (1,000) gallon tank, for example, such as fifty (50) to one hundred twenty (120) gallons per minute (GPM), often has a minimum flow rate of twenty (20) to forty (40) GPM. To allow for safe thermal expansion of LP, tanks and cylinders can only be filled to a limited level, typically eighty-five percent (85%) by volume. For an eight (8) gallon forklift cylinder, the remaining fifteen percent (15%) safe expansion volume equates to just 1.2 gallons. During a delivery, an operator must detect when a fill limit is reached, such as by observing the presence of liquid mist being expelled from a fixed liquid level gauge, and shut the hose end valve without overfilling the tank. As a result, variations in reaction time, combined with high or varying transfer rates, can create unsafe conditions associated with overfilling a tank. As an example, while filling a forklift tank at a rate of thirty (30) GPM, a reaction time of one second equates to overfilling by 0.5 gallons, or approximately forty-two percent (42%) of the 1.2 gallon safe expansion volume. A bypass valve assembly is desirable that improves redirect of excess pump output of product back into the tank, and that, in some cases, eliminates the need for a bypass loop line.

SUMMARY

The present disclosure provides a bypass valve assembly including a housing having an inlet, an outlet, and a flow passageway fluidly connected to the inlet and the outlet to allow flow of a liquid from the inlet to the outlet. The housing includes a valve seat disposed about the flow passageway between the inlet and the outlet. The bypass valve assembly also includes a movable poppet disposed in the housing to engage the valve seat in a closed position and to disengage the valve seat in an open position when pressure of the liquid in the flow passageway exceeds a preset value to allow flow of the liquid through the flow passageway from the inlet to the outlet. The bypass valve assembly includes a rotatable flow control valve disposed in the housing between the inlet and the outlet. The bypass valve assembly further includes an actuator coupled to the flow control valve to actuate and move the flow control valve to control flow of the liquid between the inlet and the outlet when the poppet is engaged with the valve seat in the closed position.

One advantage of the present disclosure is that a new bypass valve assembly is provided for LP delivery trucks and other fuel delivery trucks that maintains inlet/outlet flange geometry of existing bypass valves, allowing the bypass valve assembly to be a drop-in replacement. For example, the bypass valve assembly allows an existing fleet of bobtail trucks to be easily retrofitted to provide enhanced functionality. Another advantage of the present disclosure is that the bypass valve assembly includes an adjustable intermediate selector plate that allows a flow control valve to divert excess flow of product back to a tank so a hose end valve can deliver product at a safe and repeatable flow by compensating for variations in piping and other flow restrictions regardless of variations in the design or manufacturer of the delivery truck. As an example, a delivery truck having a pump with a minimum thirty (30) GPM flow can be adjusted with the bypass valve assembly to deliver product to the hose end valve at a rate of five (5) GPM, for instance, when filling an eight (8) gallon forklift tank, thereby reducing the likelihood of overfilling. Yet another advantage of the present disclosure is that the bypass valve assembly includes a flow control valve having a fluid passage with a narrow section and a wider section that facilitate fine flow adjustments over a larger range of valve positions under low flow conditions, allowing precise, repeatable flow. Still another advantage of the present disclosure is that the bypass valve assembly, in a manually operated configuration, allows installation flexibility for lefthand (LH) or righthand (RH) orientation with a selector lever in any of four positions to provide easy access to control. A further advantage of the present disclosure is that the bypass valve assembly includes a flow control valve that can be either manually or automatically actuated, such as by an electronic or pneumatically controlled rotary actuator. Yet a further advantage of the present disclosure is that the bypass valve assembly has reduced piping and leak points compared to a conventional loop line and eliminates the need for a bypass loop line.

Other features and advantages of the present disclosure will be readily appreciated, as the same becomes better understood, after reading the subsequent description taken in conjunction with the accompanying drawings.

BRIEF DESCRIPTION OF THE DRAWINGS

FIG. 19 is a sectional view taken along line 19-19 of FIG. 18.

DETAILED DESCRIPTION

Figure 1:
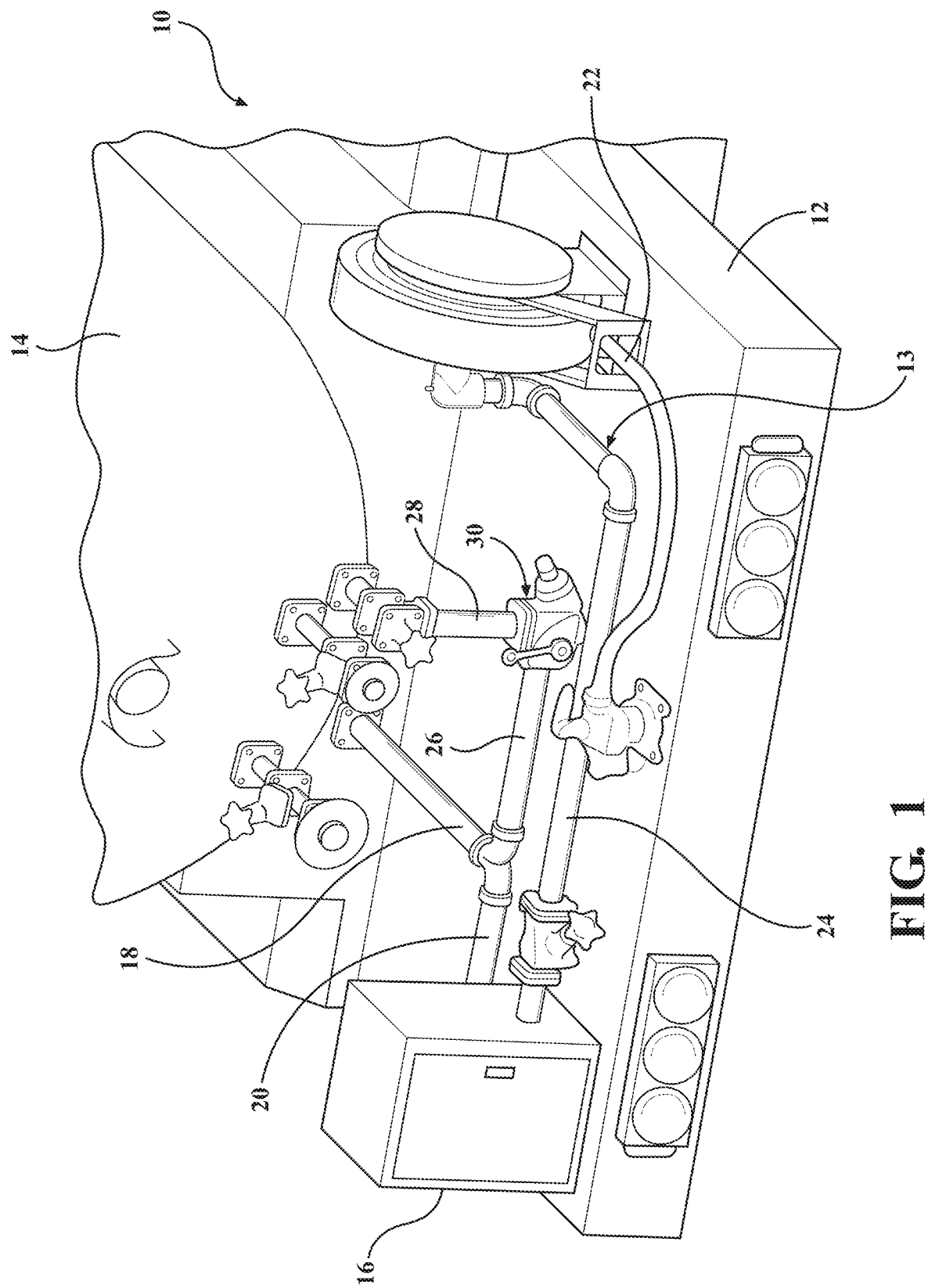
FIG. 1 is a perspective view of one embodiment of a bypass valve assembly, according to the present disclosure, illustrated in operational relationship with a fuel delivery vehicle.

Referring to FIG. 1, one embodiment of a fuel delivery vehicle 10 is shown. The fuel delivery vehicle may be, for example, a transport truck, in particular a bobtail truck, to deliver liquid product such as LP or other types of fuel. In one embodiment, the fuel delivery vehicle 10 includes a vehicle frame 12 and a delivery system, generally indicated at 13, mounted to the vehicle frame 12 to store and output the product. In one embodiment, the delivery system 13 includes a storage tank 14 mounted on the vehicle frame 12 for storing liquid product such as LP. The delivery system 13 also includes a meter 16 mounted to the vehicle frame 12 and a pump outlet line 18 fluidly connected to the meter 16 and a bypass valve assembly 30 to be described. The delivery system 13 includes a meter inlet line 20 fluidly connected to the meter 16 and the pump outlet line 18. The delivery system 13 also includes a hose 22 and a meter outlet line 24 fluidly connected to the meter 16 and the hose 22. The meter 16 is of a fixed displacement type for measuring the liquid product from the storage tank 14 for delivery to the hose 22, some of which may be bypassed back into the storage tank 14 as will be described. It should be appreciated that a pump (not shown) is located under the storage tank 14 for withdrawing fluid from the storage tank 14 and is fluidly connected to the pump outlet line 18.

The delivery system 13 also includes a bypass inlet line 26 fluidly connected to the pump outlet line 18 and a bypass outlet line 28 fluidly connected to the storage tank 14. The bypass valve assembly is fluidly connected to the bypass inlet line 26 and the bypass outlet line 28 to direct excess output of the liquid product from the pump outlet line 18 back into the storage tank 14 to limit outlet pressure to a preset value, typically 125 PSIG differential for LP-gas. It should be appreciated that the bypass valve assembly 30 is used for bypassing liquid product back into the storage tank 14 under certain conditions.

Referring now to FIGS. 2 through 10, wherein like numerals indicate like or corresponding parts throughout the several views, one embodiment of the bypass valve assembly 30 is shown. The bypass valve assembly 30 is utilized to bypass liquid product from the pump outlet line 18 back into the storage tank 14. The bypass valve assembly 30 comprises a flow control valve 62 (See FIG. 5). In one embodiment, the flow control valve 62 of the bypass valve assembly 30 is of a rotary-spool-valve type. It should be appreciated that the liquid product handled by the bypass valve assembly 30 can be liquid petroleum gas (LP-Gas), anhydrous ammonia (NH3), or any other suitable fuel. It should also be appreciated that, although the embodiment depicted of the flow control valve 62 represents a rotary-spool style valve, a ball, shut-off, or gate style flow control valve may be used.

Figure 5:
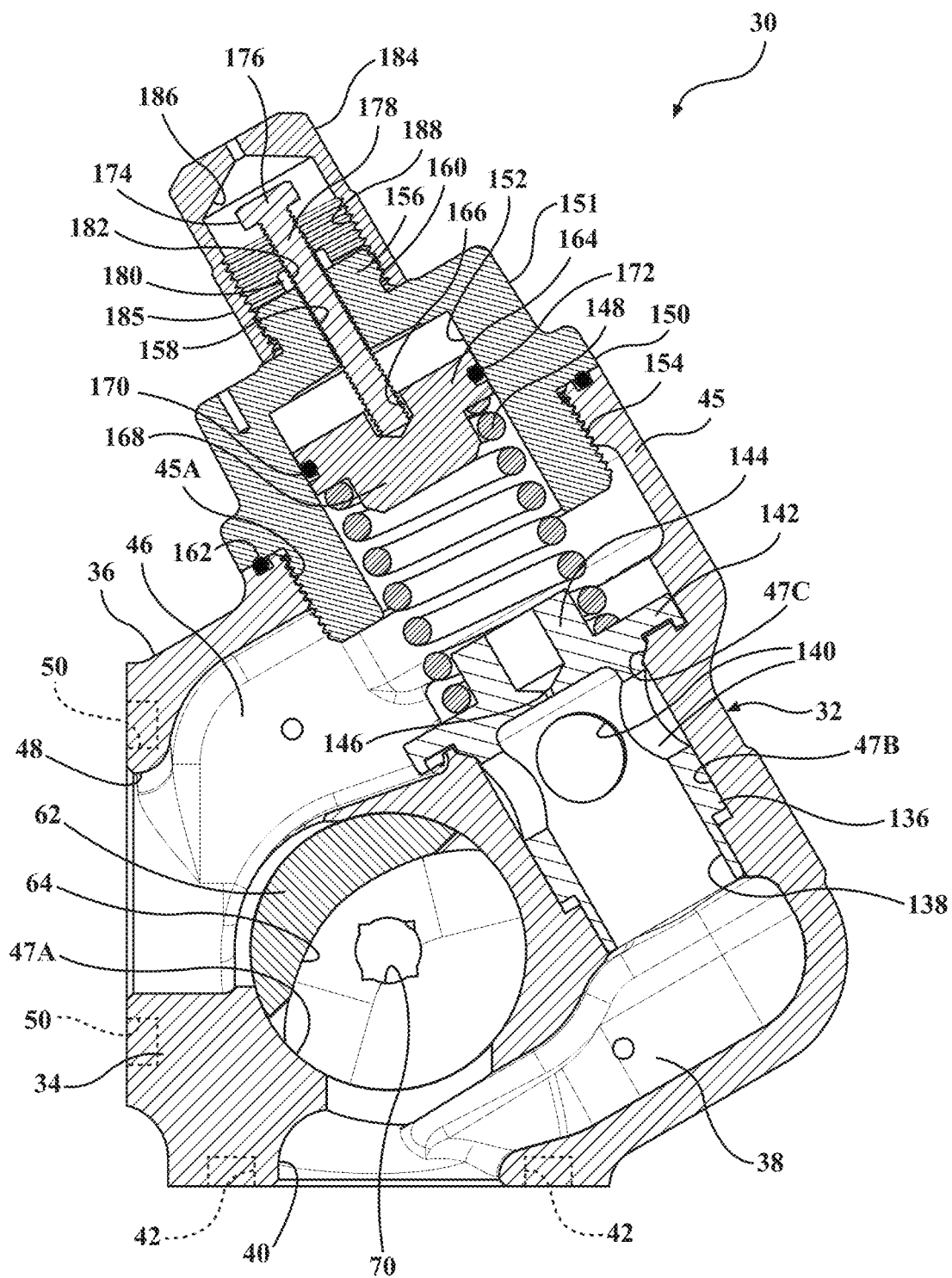
FIG. 5 is sectional view taken along line 5-5 of FIG. 4.
Figure 6:
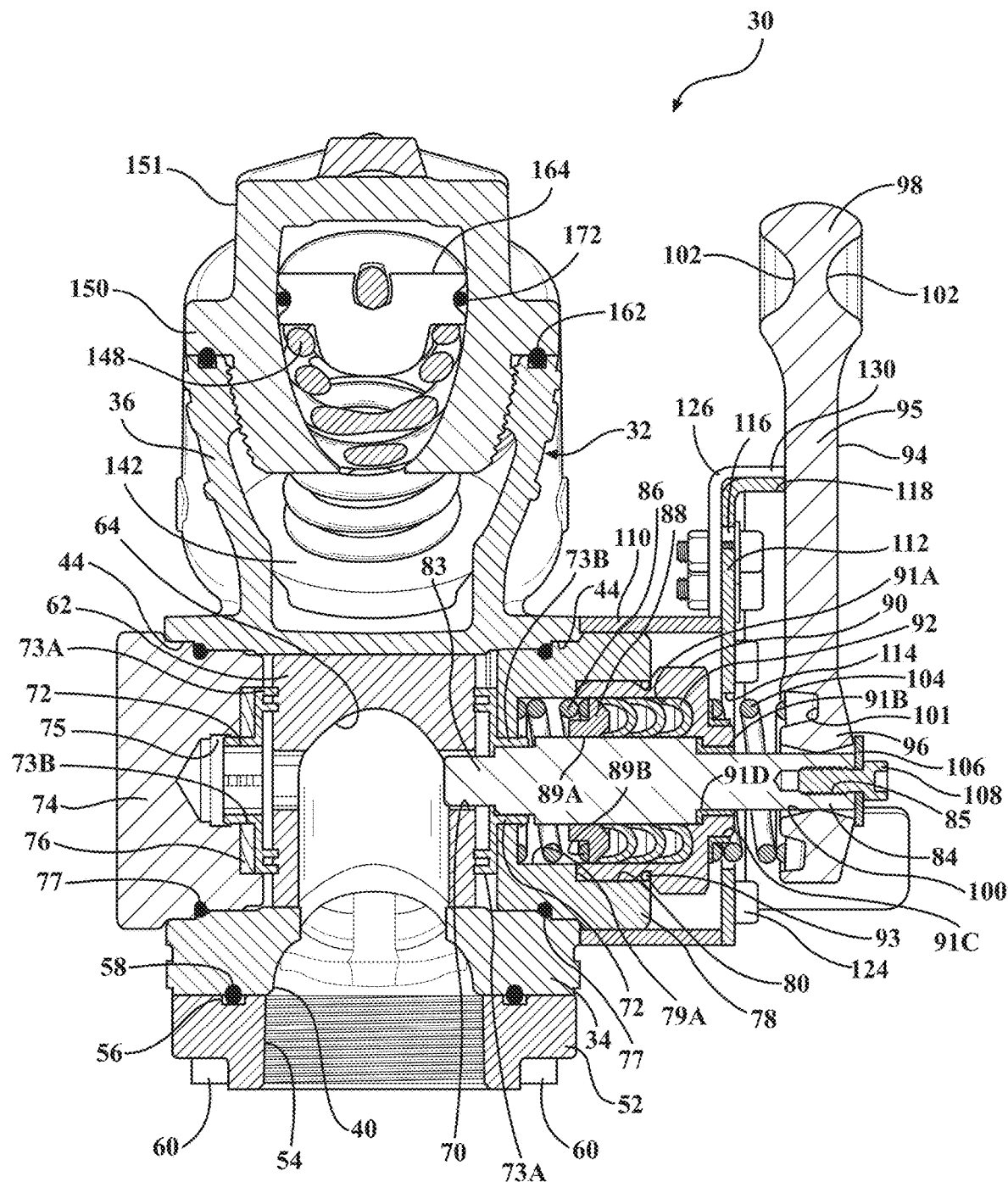
FIG. 6 is a sectional view of the bypass valve assembly of FIG. 3.
Figure 7:
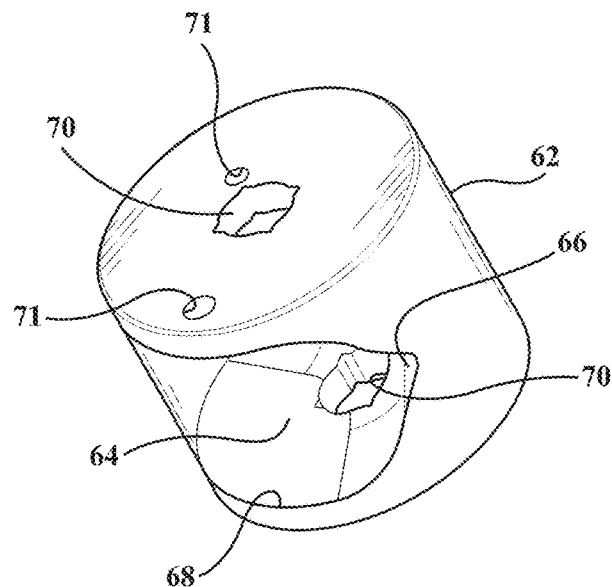
FIG. 7 is a perspective view of a flow control valve of the bypass valve assembly of FIGS. 2-6.
Figure 8:
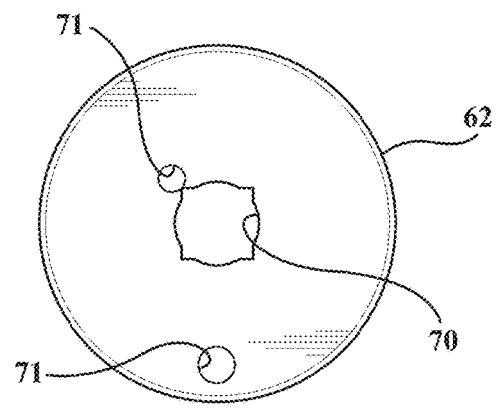
FIG. 8 is an end elevational view of the flow control valve of FIG. 7.
Figure 9:
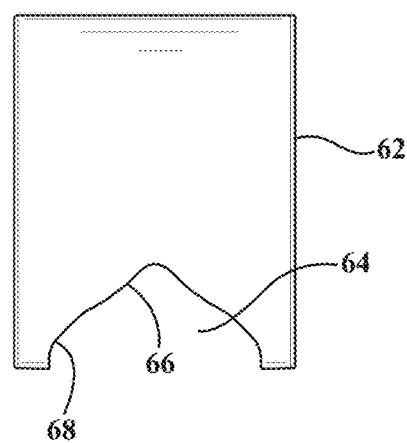
FIG. 9 is a plan view of the flow control valve of FIG. 7.
Figure 10:
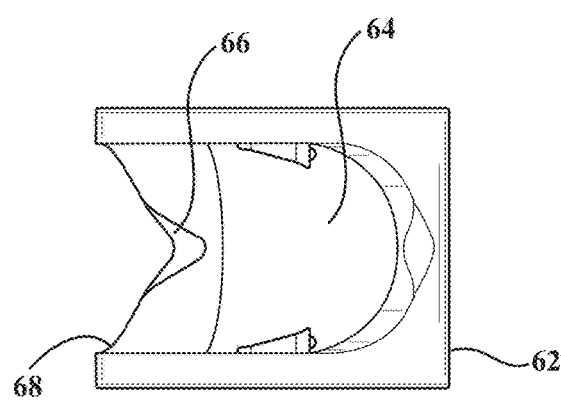
FIG. 10 is a bottom view of the flow control valve of FIG. 7.

As illustrated in FIGS. 5 and 6, the bypass valve assembly 30 includes a body or housing, generally indicated at 32. In one embodiment, the housing 32 may be formed of metal and be integral, unitary, and one-piece. The housing 32 includes a lower housing portion 34 and an upper housing portion 36. In one embodiment, the lower housing portion 34 is generally rectangular in shape, but may be any suitable shape, and includes an internal lower chamber 38 (See FIG. 5). The lower housing portion 34 includes an aperture or inlet 40 at a bottom thereof to receive liquid product into the internal lower chamber 38. The lower housing portion 34 also includes one or more threaded apertures 42 spaced radially from the inlet 40 and extending inward. The lower housing portion 34 further includes opposed threaded side apertures 44 (See FIG. 6) extending therein and communicating with the internal lower chamber 38 to allow assembly of components of the flow control valve 62 to be described. In one embodiment, the side apertures 44 are generally circular in shape, but may be any suitable shape.

In one embodiment, the upper housing portion 36 is generally rectangular in shape, but may be any suitable shape. The upper housing portion 36 includes a valve portion 45 extending at an angle from the lower housing portion 34. In one embodiment, the valve portion 45 is generally cylindrical and circular in cross-sectional shape, but may be any suitable shape. The valve portion 45 includes a threaded aperture 45A (See FIG. 5) at one end in communication with an internal upper chamber 46 of the upper housing portion 36. The upper housing portion 36 includes a first flow passageway 47A and a second flow passageway 47B fluidly connected to the internal lower chamber 38 and the internal upper chamber 46. The upper housing portion 36 includes a valve seat 47C in the valve portion 45 at one end of the second flow passageway 47B. The upper housing portion 36 includes an aperture or outlet 48 at one end thereof communicating with the internal upper chamber 46 to exhaust liquid product from the internal upper chamber 46. The upper housing portion 36 further includes one or more threaded apertures 50 spaced radially from the inlet 40 and extending inward.

Figure 3:
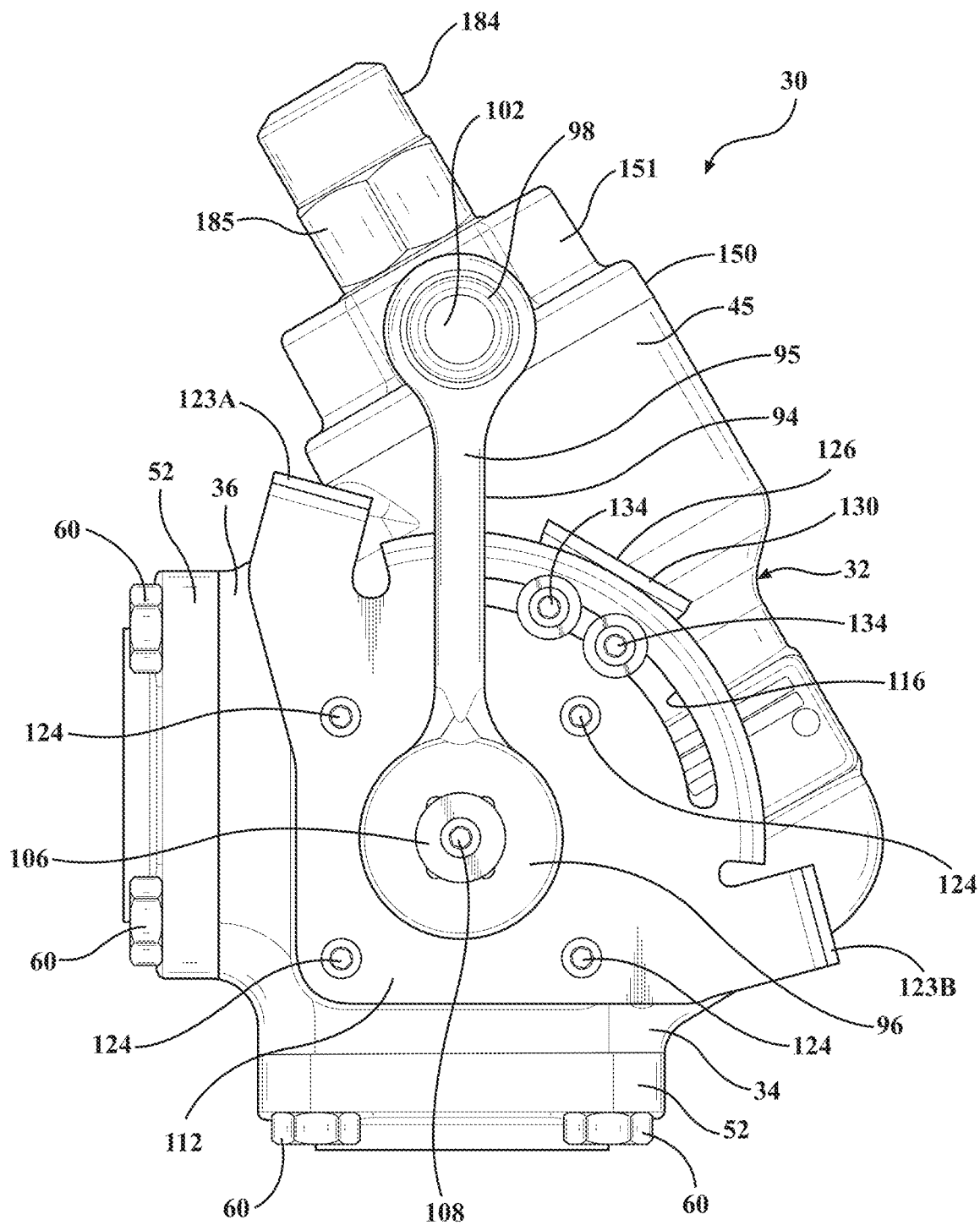
FIG. 3 is a side elevational view of the bypass valve assembly of FIG. 1 illustrated with connection flanges.

As illustrated in FIGS. 3 and 6, the bypass valve assembly 30 may include one or more connection flanges 52 coupled to the lower housing portion 34 at the inlet 40 and the upper housing portion 36 at the outlet 48, to facilitate respective connection to the bypass inlet line 26 and the bypass outlet line 28, respectively. In one embodiment, the connection flange 52 is generally rectangular in shape, but may be any suitable shape, to mate with the lower housing portion 34 or the upper housing portion 36. The connection flange 52 includes a threaded aperture 54 (See FIG. 6) extending therethrough to be threadably coupled to the bypass inlet line 26 or the bypass outlet line 28. The connection flange 52 also includes a groove 56 (See FIG. 6) spaced radially from the threaded aperture 54 and extending axially inward and circumferentially about the threaded aperture 54. The connection flange 52 further includes one or more fastener through-apertures (not shown) extending axially therethrough and aligned with the threaded apertures 42 and 50 of the lower housing portion 34 and the upper housing portion 36, respectively. The connection flange 52 is made of a metal material and is integral, unitary, and one-piece.

The bypass valve assembly 30 includes a seal 58 disposed in the groove 56 of the connection flange 52. In one embodiment, the seal 58 is an O-ring. The bypass valve assembly 30 also includes one or more fasteners 60 such as threaded screws to extend through the fastener through-apertures in the connection flange 52 and threadably engage the threaded apertures 42 in the lower housing portion 34 or the threaded apertures 50 in the upper housing portion 36.

Referring to FIGS. 4-10, the flow control valve 62 is rotatably disposed within the lower housing portion 34 in the first flow passage 47A between the internal lower chamber 38 and the internal upper chamber 46. The flow control valve 62 is generally cylindrical and circular in cross-sectional shape, but may be any suitable shape, to block or allow flow of liquid product between the internal lower chamber 38 and the internal upper chamber 46. In one embodiment, as illustrated in FIGS. 7-10, the flow control valve 62 includes a flow passage 64 having a first or narrow section 66 and a second or wider section 68 with an axial width greater than an axial width of the first section 66. In one embodiment, the first section 66 and the second section 68 form a general "V" shape, but may be any suitable shape. The flow control valve 62 also includes a central aperture 70 extending through each axial end to allow the flow control valve 62 to be rotatably supported and one or more side apertures 71 (See FIGS. 7 and 8) spaced radially from the central aperture 70. In one embodiment, the central aperture 70 is generally rectangular in shape, but may be any suitable shape. The first side aperture 71 adjacent the central aperture 70 receives a pin (not shown) to prevent misalignment and the second side aperture 71 adjacent the outer diameter of the flow control valve 62 is used for visually distinguishing between right-hand and left-hand ends of the flow control valve 62. The flow control valve 62 is made of a metal material and is integral, unitary, and one-piece. It should be appreciated that the flow passage 64 includes the first section 66 and the second section 68 to facilitate finer flow adjustments over a larger range of positions of the flow control valve 62 under low flow conditions. It should also be appreciated that the flow control valve 62 is integrated into the bypass valve assembly 30 and housed within the same body or housing 32.

The bypass valve assembly 30 includes a bearing 72 (See FIG. 6) disposed at each axial end of the flow control valve 62 and a plug 74 supporting the bearing 72 and coupled to the lower housing portion 34. In one embodiment, the bearing 72 is generally circular in shape, but may any suitable shape, and includes a contact portion 73A extending axially from one side to contact the axial end of the flow control valve 62 and a support portion 73B extending axially from the other side to be supported by the plug 74. In one embodiment, the contact portion 73A is generally circular in shape, but may be any suitable shape, to contact the flow control valve 62 and the support portion 73B is generally cylindrical in shape with a generally circular cross-sectional shape, but may be any suitable shape. The bearing 72 is made of a metal material and is integral, unitary, and one-piece. In one embodiment, the plug 74 is generally cylindrical in shape with a generally circular cross-sectional shape, but may be any suitable shape to cooperate with one of the side apertures 44 of the lower housing portion 34. In one embodiment, the plug 74 includes a cavity 75 (See FIG. 6) extending axially inward to receive the support portion 73B of the bearing 72 and has a threaded portion (not shown) to threadably engage the one of the side apertures 44 of the lower housing portion 34. The plug 74 is made of a metal material and is integral, unitary, and one-piece.

The bypass valve assembly 30 also includes a spring 76 (See FIG. 6) disposed about the support portion 73B of the bearing 72 and axially between the bearing 72 and the plug 74 to bias the bearing 72 into engagement with the flow control valve 62. In one embodiment, the spring 76 is a wave disc spring. The bypass valve assembly 30 includes a seal 77 disposed between the plug 74 and the lower housing portion 34. In one embodiment, the seal 77 is an O-ring. The bypass valve assembly 30 also includes a drive shaft or stem 82 attached to either one of the axial ends of the flow control valve 62 and engaging the side apertures 70 (See FIGS. 7 and 8) of the flow control valve 62. It should be appreciated that the bearings 72 and spring 76 apply an axial friction force to dampen vibration of the flow control valve 62.

As illustrated in FIG. 6, the bypass valve assembly 30 further includes a bonnet 78 supporting the bearing 72 on the other axial end of the flow control valve 62 and coupled to the lower housing portion 34. In one embodiment, the bonnet 78 is generally cylindrical in shape with a generally circular cross-sectional shape, but may be any suitable shape, to cooperate with the other one of the side apertures 44 of the lower housing portion 34. In one embodiment, the bonnet 78 includes a cavity 79A extending axially inward to receive the support portion 73B of the bearing 72 and has a threaded portion (not shown) to threadably engage the other one of the side apertures 44 of the lower housing portion 34. The cavity 79A may include a threaded portion 80. The bonnet 78 is made of a metal material and is integral, unitary, and one-piece. It should be appreciated that the bypass valve assembly 30 includes another seal 77 disposed between the bonnet 78 and the lower housing portion 34.

The drive shaft or stem 82 extends axially and is coupled to the flow control valve 62. In one embodiment, the stem 82 is generally cylindrical in shape with a circular cross-section, but may be any suitable shape, to be coupled to the flow control valve 62. In one embodiment, the stem 82 has a first reduced portion 83 at one axial end to engage the support portion 73B of the bearing 72 and one of the central apertures 70 in the flow control valve 62. In one embodiment, the reduced portion 83 is generally rectangular in shape, but may be any suitable shape, to form a male member to engage the corresponding female central aperture 70 of the flow control valve 62. The stem 82 has a second reduced portion 84 at the other axial end to engage a handle or selector lever 94 to be described. In one embodiment, the second reduced portion 84 is generally rectangular in shape, but may be any suitable shape, to form a male member to engage a corresponding female aperture 100 on the selector lever 94. The stem 82 also includes a threaded aperture 85 extending axially inward into the second reduced diameter portion 84. The stem 82 is made of metal material and is integral, unitary, and one-piece.

The bypass valve assembly 30 includes a spring 86 extending axially and having one end disposed in the cavity 79A of the bonnet 78 and about the stem 82. In one embodiment, the spring 86 is a compression spring. The bypass valve assembly 30 also includes a bushing 88 disposed in the cavity 79A of the bonnet 78 to engage the other end of the spring 86. In one embodiment, the bushing 88 is generally circular in shape, but may have any suitable shape, to engage the spring 86. In one embodiment, the bushing 88 has an aperture 89A extending axially therethrough to allow the bushing 88 to be disposed about the stem 82 and a recess 89B to seat the end of the spring 86. The bushing 88 is made of metal material and is integral, unitary, and one-piece. It should be appreciated that the bushing 88 is movable relative to the stem 82.

The bypass valve assembly 30 includes a gland 90 disposed about the stem 82 and coupled to the bonnet 78. In one embodiment, the gland 90 is generally cylindrical in shape with a generally circular cross-sectional shape, but may be any suitable shape, to cooperate with the cavity 79A of the bonnet 78. In one embodiment, the gland 90 includes a cavity 91A extending axially inward to receive the bushing 88 and has a threaded portion (not shown) to threadably engage the threaded portion 80 of the cavity 79A of the bonnet 78 and a protrusion 91B extending axially outwardly from the other end. In one embodiment, the protrusion 91B is generally cylindrical in shape with a generally circular cross-section, but may be any suitable shape. The gland 90 is made of metal material and is integral, unitary, and one-piece. The bypass valve assembly 30 includes a spring bearing or seat 91C disposed about the protrusion 91B and a bearing 91D disposed between the stem 82 and the gland 90.

The bypass valve assembly 30 also includes a plurality of v-packing seals 92 disposed about the stem 82 and inside the cavity 91A of the gland 90 and axially between the bushing 88 and one end of the gland 90. The bypass valve assembly 30 may include a stem bearing (not shown) disposed about the stem 82 and a seal 93 disposed between the gland 90 and the bonnet 78. In one embodiment, the seal 93 is an O-ring. It should be appreciated that the plug 74 and the bonnet 78 close the side apertures 44 in the lower housing portion 34. It should also be appreciated that installation of the plug 74 and the bonnet 78 could be reversed from the configuration shown, e.g., the bypass valve assembly 30 could be set up in a lefthand or righthand orientation.

Figure 4:
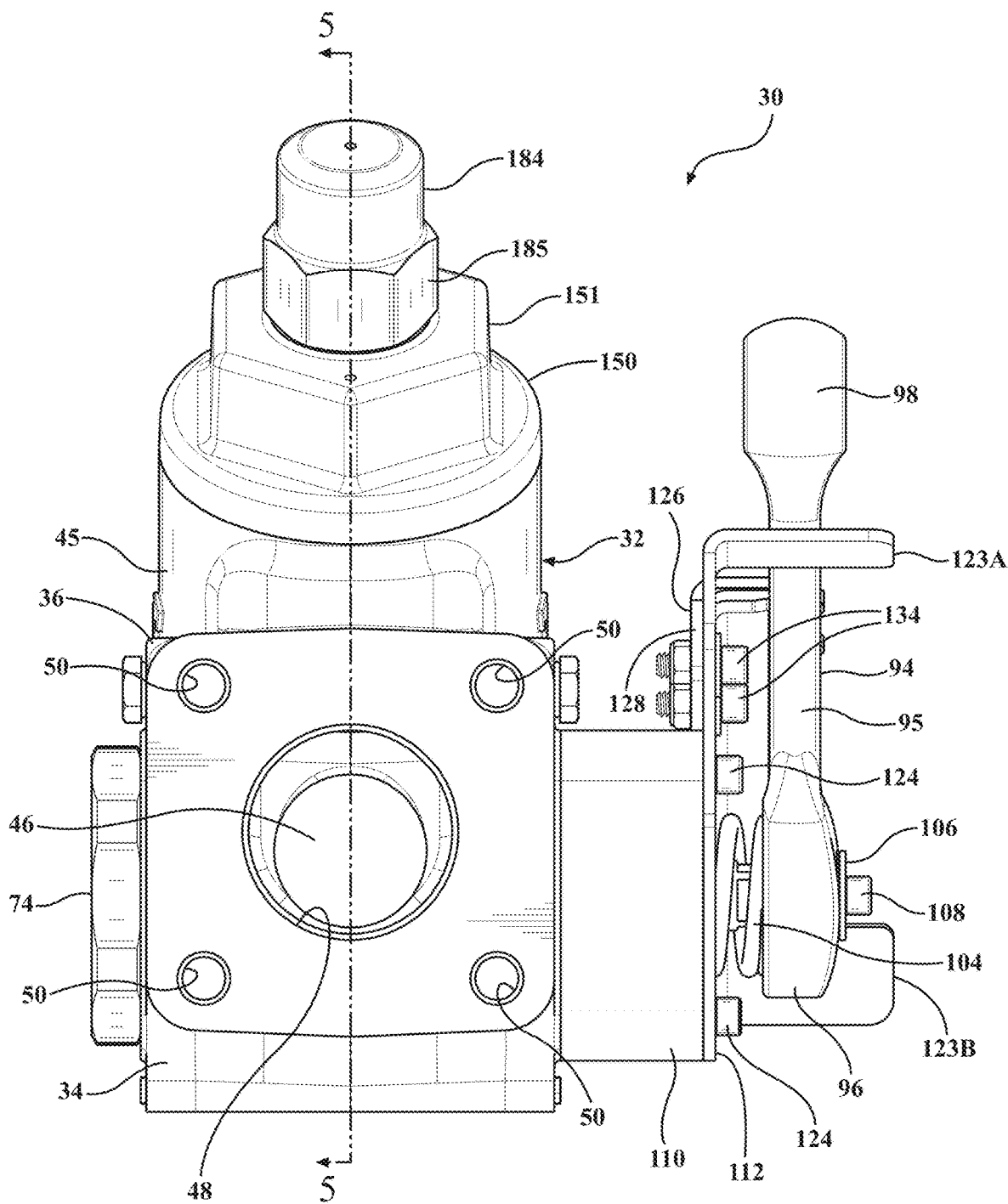
FIG. 4 is a front elevational view of the bypass valve assembly of FIG. 2.

The bypass valve assembly 30 includes an actuator coupled to the flow control valve 62 to actuate or rotate the flow control valve 62 to control flow of the liquid between the inlet 40 and the outlet 48. In one embodiment, as illustrated in FIGS. 4 and 6, the actuator may be a manually movable handle or selector lever 94 coupled to the stem 82. In one embodiment, the selector lever 94 extends radially outwardly relative to the stem 82. In one embodiment, the selector lever 94 has a shaft portion 95 and a first enlarged end 96 at one end of the shaft portion 95 and a second enlarged end 98 at the other end of the shaft portion 95. In one embodiment, the first enlarged end 96 is generally circular in shape, but may be any suitable shape, and includes the aperture 100 extending axially therethrough to receive the second reduced portion 84 of the stem 82 and a groove 101 extending radially therein and circumferentially about the aperture 100 on one side thereof. In one embodiment, the second enlarged end 98 is generally circular in shape, but may be any suitable shape, and has a diameter less than a diameter of the first enlarged end 96. The second enlarged end 98 includes a recess 102 extending axially inwardly on each side thereof. The selector lever 94 is made of metal material and is integral, unitary, and one-piece.

The bypass valve assembly 30 includes a spring 104 and a spring bearing (not shown) disposed between the gland 90 and the selector lever 94. In one embodiment, the spring 104 is a compression spring to bias the selector lever 94 away from the gland 90. The spring 104 has one end seated about the protrusion 91B of the gland 90 (which acts as a spring seat) and another end seated in the groove 101 of the first enlarged end 96 of the selector lever 94. The bypass valve assembly 30 further includes a washer 106 disposed against the second reduced diameter portion 84 of the stem 82 and the first end 96 of the selector lever 94. The bypass valve assembly 30 also includes a fastener 108 such as a threaded screw that threadably engages the threaded aperture 85 in the second reduced diameter portion 84 of the stem 82 to removably fasten the selector lever 94 to the stem 82. The aperture 100 is sized and shaped so that actuation of the selector lever 94 rotates the stem 82 and the flow control valve 62 about a rotational axis, yet allows slight rocking of the selector lever 94, under the bias of the spring 104 so that the selector lever 94 can be moved to the various positions described herein.

The bypass valve assembly 30 includes a spacer plate 110 disposed adjacent one side of the lower housing portion 34. In one embodiment, the spacer plate 110 is a generally annular ring and is generally circular in shape, but may be any suitable shape, to be disposed about a portion of the bonnet 78. The spacer plate 110 is made of metal or polymeric material and is integral, unitary, and one-piece.

Figure 2:
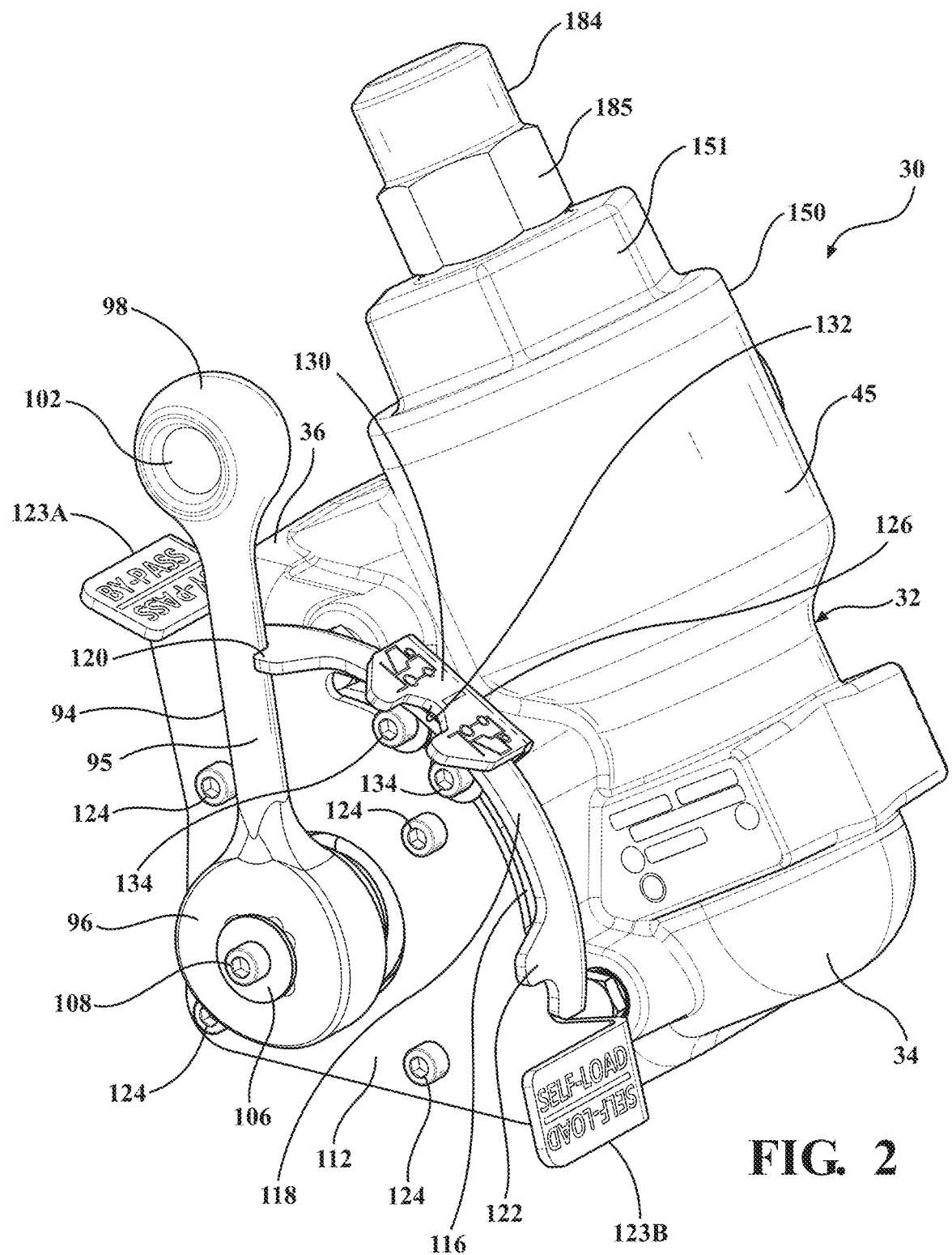
FIG. 2 is a perspective view of the bypass valve assembly of FIG. 1 illustrated in a first operational position.

As illustrated in FIGS. 2 and 3, the bypass valve assembly 30 includes a lever plate 112 disposed adjacent one end of the spacer plate 110. In one embodiment, the lever plate 112 is generally planar in shape, but may have any suitable shape. The lever plate 112 includes a first aperture 114 (see FIG. 6) extending axially therethrough to allow the stem 82 and spring 104 to extend therethrough. In one embodiment, the first aperture 114 is generally circular in shape, but may be any suitable shape. The lever plate 112 also includes one or more second apertures (not shown) spaced from the first aperture 114. The lever plate 112 further includes a slot 116 extending axially therethrough and circumferentially. In one embodiment, the slot 116 is generally arcuate and convex in shape. The lever plate 112 includes a first flange 118 extending axially outwardly at one end and circumferentially. The first flange 118 has a first stop projection 120 extending axially outwardly near one end and a second stop projection 122 extending axially outwardly near the other end and spaced from the first stop projection 120 to define predefined positions for the selector lever 94. The lever plate 112 may include a second flange 123A and a third flange 123B spaced circumferentially from the first flange 118 and extending axially outwardly. In one embodiment, the second flange 123A includes indicia to indicate "BYPASS" and the third flange 123B includes indicia to indicate "SELF-LOAD". Other indicia are also contemplated. The lever plate 112 is made of metal material and is integral, unitary, and one-piece.

The bypass valve assembly 30 includes one or more fasteners 124 to fasten the lever plate 112 to the lower housing portion 34. In one embodiment, the fasteners 124 are threaded screws that extend through the second apertures in the lever plate 112 and threadably engage corresponding threaded apertures (not shown) in the lower housing portion 34. Notably, owing to the square pattern of second apertures and fasteners 124, the lever plate 112 can be mounted to the lower housing portion 34 in multiple orientations relative to the lower housing portion 34 so that users can customize the position of the lever plate 112 for convenience. For example, in the embodiment shown, the lever plate 112 can be oriented in four different positions (not shown).

The bypass valve assembly 30 also includes an intermediate adjustable plate or lever adjustment bracket 126 coupled to the lever plate 112. In one embodiment, the lever adjustment bracket 126 is generally "L" shaped, but may be any suitable shape. The lever adjustment bracket 126 includes a first portion 128 (See FIG. 4) extending radially and disposed adjacent the lever plate 112. The first portion 128 includes one or more apertures (not shown) extending axially therethrough. The lever adjustment bracket 126 includes a second portion 130 (See FIG. 2) extending axially to the first portion 128 to extend axially over the first flange 118 of the lever plate 112. The second portion 130 includes a recess 132 extending axially therein to receive the shaft portion 95 of the selector lever 94 to define a predefined position. The lever adjustment bracket 126 is made of metal material and is integral, unitary, and one-piece.

The bypass valve assembly 30 includes one or more fasteners 134 such as screws, washers, and nuts to removably and adjustably fasten the lever adjustment bracket 126 relative to the lever plate 112. In one embodiment, the screws of the fasteners 134 extend through the apertures in the first portion 128 of the lever adjustment bracket 126 and the slot 116 of the lever plate 112 and are secured in place by the washers and nuts of the fasteners 134. It should be appreciated that the fasteners 134 may be loosened and the lever adjustment bracket 126 moved along the slot 116 and re-secured in place to define another predefined position. Although only a single intermediate adjustment plate is shown, other intermediate adjustment plates are contemplated, and/or an intermediate adjustment plate defining two or more predefined positions for the selector lever 94 are also possible.

As illustrated in FIG. 5, the bypass valve assembly 30 also includes a movable valve or poppet 136 disposed in the valve portion 45 of the upper housing portion 36. In one embodiment, the movable poppet 136 is generally cylindrical in shape, but may have any suitable shape, and is disposed in the second flow passageway 47B to cooperate with the valve seat 47C. The poppet 136 includes a cavity 138 extending axially inwardly and one or more apertures or openings 140 extending radially therein and fluidly communicating with the cavity 138. The poppet 136 also includes a flange 142 extending radially at one end to overlap the second flow passageway 47B. The poppet 136 includes a spring seat 144 extending axially and having a generally cylindrical shape with a generally circular cross-section, but may have any suitable shape.

The poppet 136 includes an aperture 146 extending through the spring seat 144 and fluidly communicating with the cavity 138. The aperture 146 is much smaller than the opening defined by the valve seat 47C for purposes of bleeding fluid therethrough, and may not be present in certain embodiments. The poppet 136 is made of metal material and is integral, unitary, and one-piece. It should be appreciated that the poppet 136 engages the valve seat 47C in a closed position and disengages the valve seat 47C in an open position when pressure of the liquid in the second flow passageway 47B exceeds a preset value to allow flow of the liquid through the second flow passageway 47B. When the poppet 136 is unseated from the valve seat 47C, fluid is allowed to flow from the inlet 40, through the internal lower chamber 38, through the second flow passageway 47B, into the internal upper chamber 46 by virtue of the openings 140, and out through the outlet 48.

The bypass valve assembly 30 also includes a spring 148 disposed in the valve portion 45 of the upper housing portion 36 to bias the poppet 136 in the closed position with the valve seat 47C. In one embodiment, the spring 148 is a compression spring. The spring 148 has one end seated about the spring seat 144 of the poppet 136. The bypass valve assembly 30 further includes a bonnet 150 coupled to the valve portion 45 of the upper housing portion 36. In one embodiment, the bonnet 150 is generally cylindrical in shape with a generally circular cross-sectional shape, but may be any suitable shape to cooperate with the threaded aperture 45A of the valve portion 45 of the upper housing portion 36. The bonnet 150 has an outer surface portion 151 with a generally octagonal shape, but may have any suitable shape, for engagement with a tool (not shown). In one embodiment, the bonnet 150 includes a cavity 152 extending axially inward to receive the other end of the spring 148 and a threaded portion 154 to threadably engage the threaded aperture 45A of the valve portion 45 of the upper housing portion 36. The bonnet 150 also includes a cap portion 156 extending axially from an end thereof. In one embodiment, the cap portion 156 is generally cylindrical in shape with a generally circular cross-sectional shape, but may be any suitable shape, and includes an internal threaded aperture 158 extending axially therethrough and communicating with the cavity 152, and an external threaded portion 160. The bonnet 150 is made of a metal material and is integral, unitary, and one-piece. It should be appreciated that the bypass valve assembly 30 includes a seal 162 such as an O-ring disposed between the bonnet 150 and the upper housing portion 36.

The bypass valve assembly 30 also includes a spring guide 164 disposed in the cavity 152 of the bonnet 150 to engage the other end of the spring 148. In one embodiment, the spring guide 164 is generally circular in shape, but may have any suitable shape to engage the spring 148. In one embodiment, the spring guide 164 includes a recess 166 extending axially inward in one end and a spring seat 168 extending axially outward from the other axial end to seat the end of the spring 148. In one embodiment, the spring seat 168 is generally cylindrical in shape with a circular cross-section, but may be any suitable shape, to allow the end of the spring 148 to be disposed over and about the spring seat 168. The spring guide 164 also includes a groove 170 extending radially therein and circumferentially thereabout. The spring guide 164 is made of metal material and is integral, unitary, and one-piece. It should be appreciated that the bypass valve assembly 30 includes a seal 172 such as an O-ring disposed in the groove 170 between the spring guide 164 and the bonnet 150. It should also be appreciated that the spring guide 164 is movable relative to the bonnet 150.

The bypass valve assembly 30 includes a stem 174 to engage the spring guide 164. In one embodiment, the stem 174 includes a head 176 extending radially and a threaded shaft 178 extending axially from the head 176 to an end disposed in the recess 166 of the spring guide 164. The threaded shaft 178 threadably engages the threaded aperture 158. The bypass valve assembly 30 also includes a lock nut 180 to engage the stem 174 to prevent backing out of the stem 174 from the threaded aperture 158 of the bonnet 150. In one embodiment, the lock nut 180 includes a threaded aperture 182 to threadably engage the shaft 178 of the stem 174, and the lock nut 180 abuts the cap portion 156 of the bonnet 150. It should be appreciated that the stem 174 may be adjusted to compress or release the spring 148 to set the poppet 136 to move at a set point of flow pressure at a preset or predetermined value and release flow from the second flow passageway 47B to the internal upper chamber 46 when the flow pressure exceeds the preset value.

The bypass valve assembly 30 further includes a cap 184 coupled to the bonnet 150 to cover the stem 174. In one embodiment, the cap 184 is generally cylindrical in shape with a generally circular cross-sectional shape, but may be any suitable shape, to mate with the cap portion 156 of the bonnet 150. The cap 184 has an outer surface portion 185 with a generally octagonal shape, but may have any suitable shape, for engagement with a tool (not shown). In one embodiment, the cap 184 includes a cavity 186 extending axially inward and has a threaded portion 188 to threadably engage the external threaded portion 160 of the cap portion 156 of the bonnet 150. It should be appreciated that the bypass valve assembly 30 may include other components such as valve plugs, elbow, name plate, etc., not specifically described.

Referring to FIGS. 2-6, the bypass valve assembly 30 is illustrated in a first or closed bypass position, enabling normal bypass operation of the liquid product. The selector lever 94 is in a first predefined position of the lever plate 112 and the flow control valve 62 is in a first position with the poppet 136 seated on the valve seat 47C. In this position, the flow control valve 62 is closed to block flow through the first flow passageway 47A and, if the flow pressure of the liquid product exceeds the preset value, the poppet 136 moves off the valve seat 47C to allow liquid product to flow from the inlet 40 to the outlet 48. It should be appreciated that the selector lever 94 is in a manually operated configuration.

Figure 11:
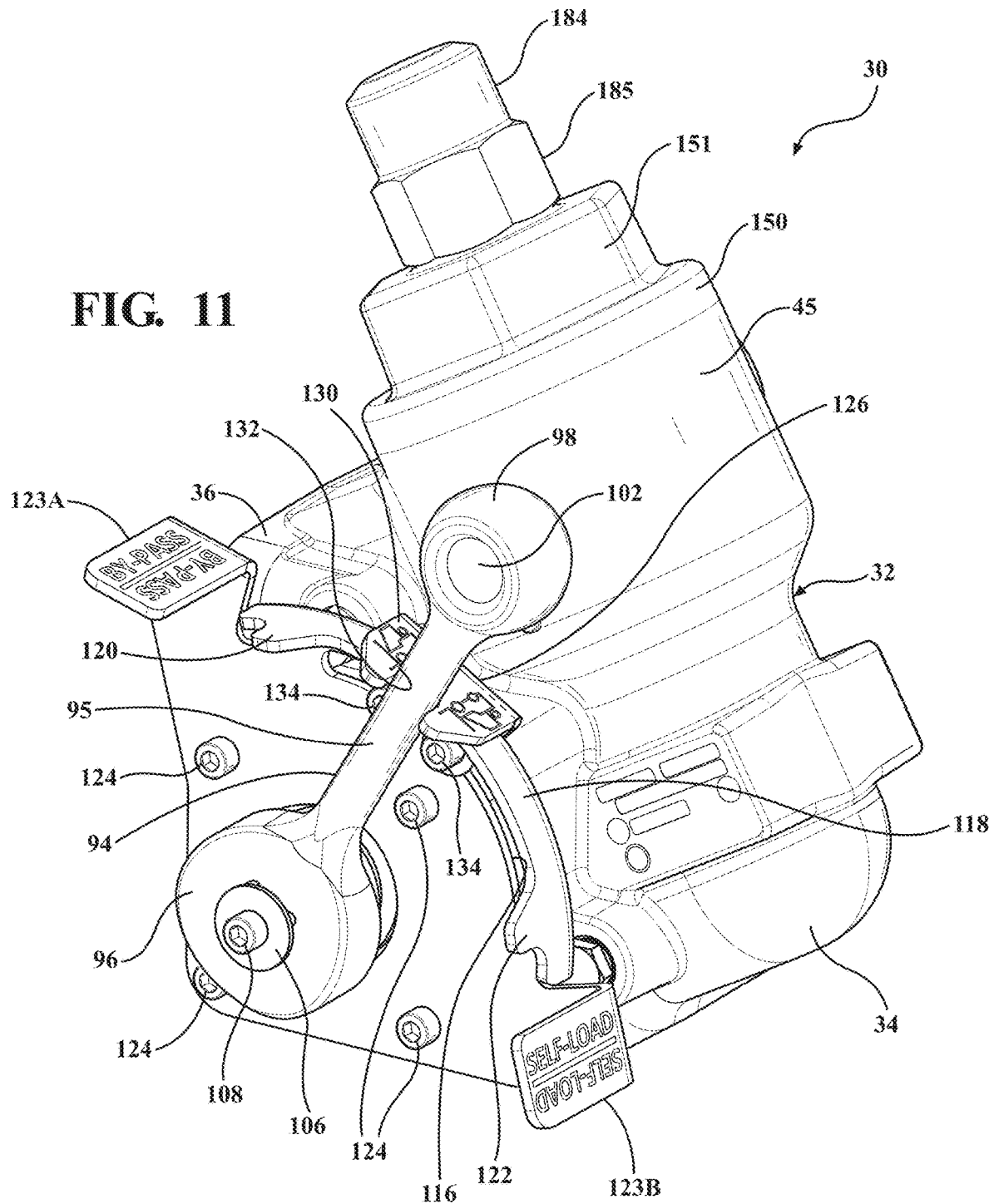
FIG. 11 is a perspective view of the bypass valve assembly of FIG. 1 illustrated in a second operational position.
Figure 12:
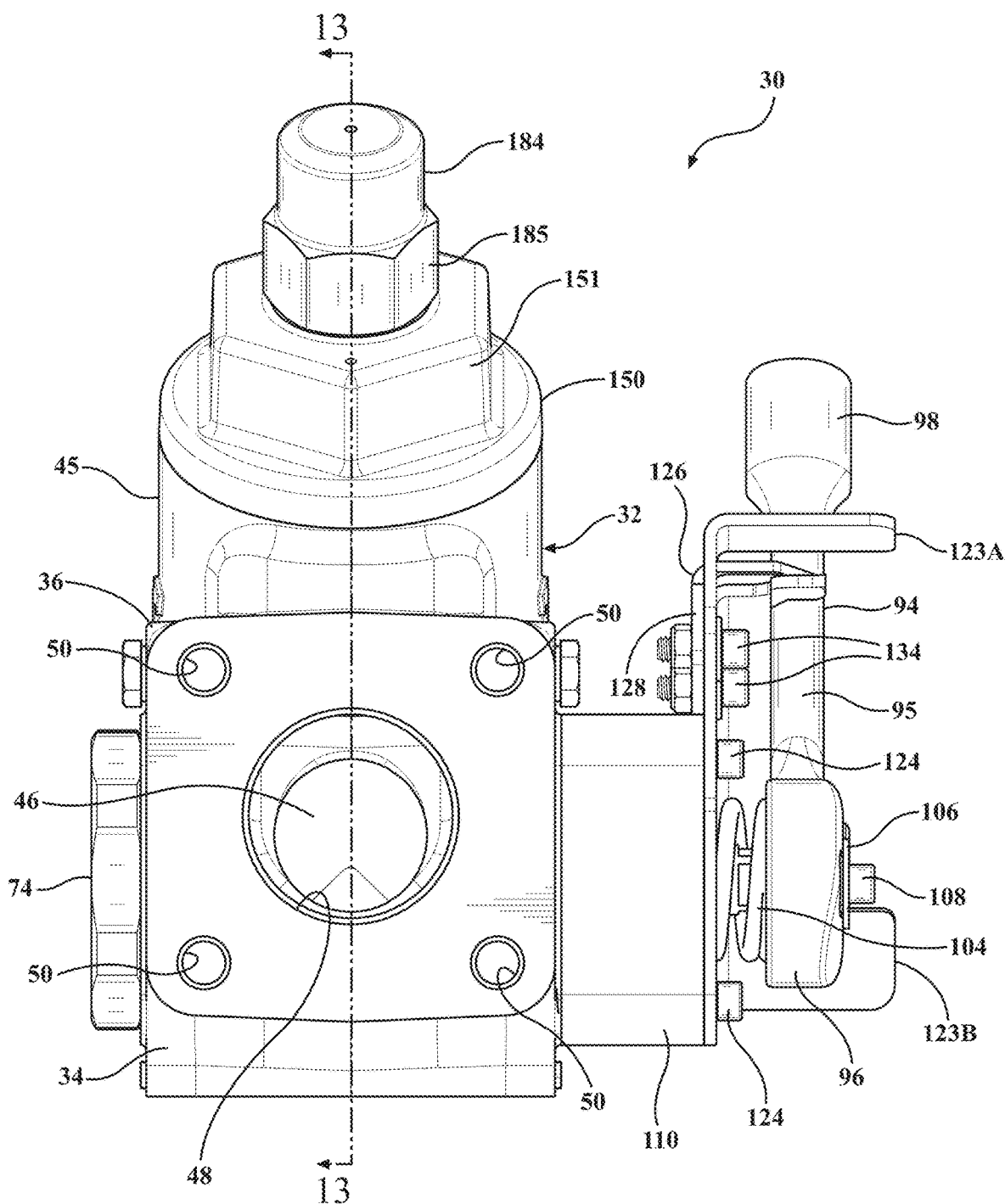
FIG. 12 is a front elevational view of the bypass valve assembly of FIG. 11.
Figure 13:
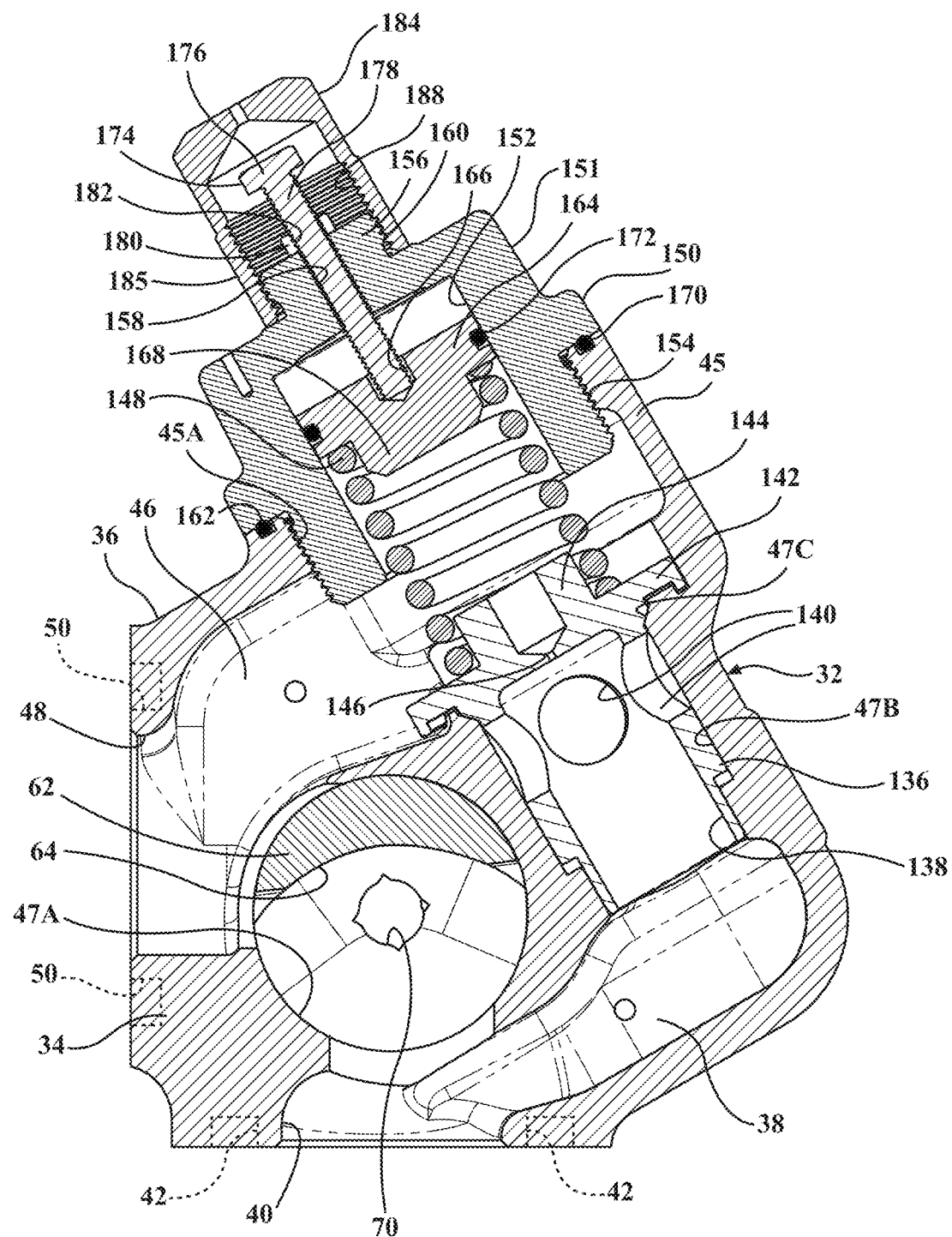
FIG. 13 is a sectional view taken along line 13-13 of FIG. 12.

Referring to FIGS. 11-13, the bypass valve assembly 30 is illustrated in a second or variable position, enabling partial flow of the liquid product. The selector lever 94 is in a second predefined position of the lever plate 112 and the flow control valve 62 is moved or rotated to a second position with the poppet 136 seated on the valve seat 47C. In this position, the flow control valve 62 is partially open to allow flow through the first flow passageway 47A, allowing a portion of the output of the pump or the pump outlet line 18 to flow back to the storage tank 14, enabling a desired reduced and consistent flow rate to a hose end delivery valve of the hose 22 for safely filling small cylinders, such as 8 gallon forklift tanks. It should be appreciated that, in the manually operated configuration, the intermediate adjustable plate or lever adjustment bracket 126 that receives the selector lever 94 allows the flow passage 64 of the flow control valve 62 to be adjusted to correspond to any desired level of flow, from fully closed to fully open, and to be secured in a desired predefined position.

Figure 14:
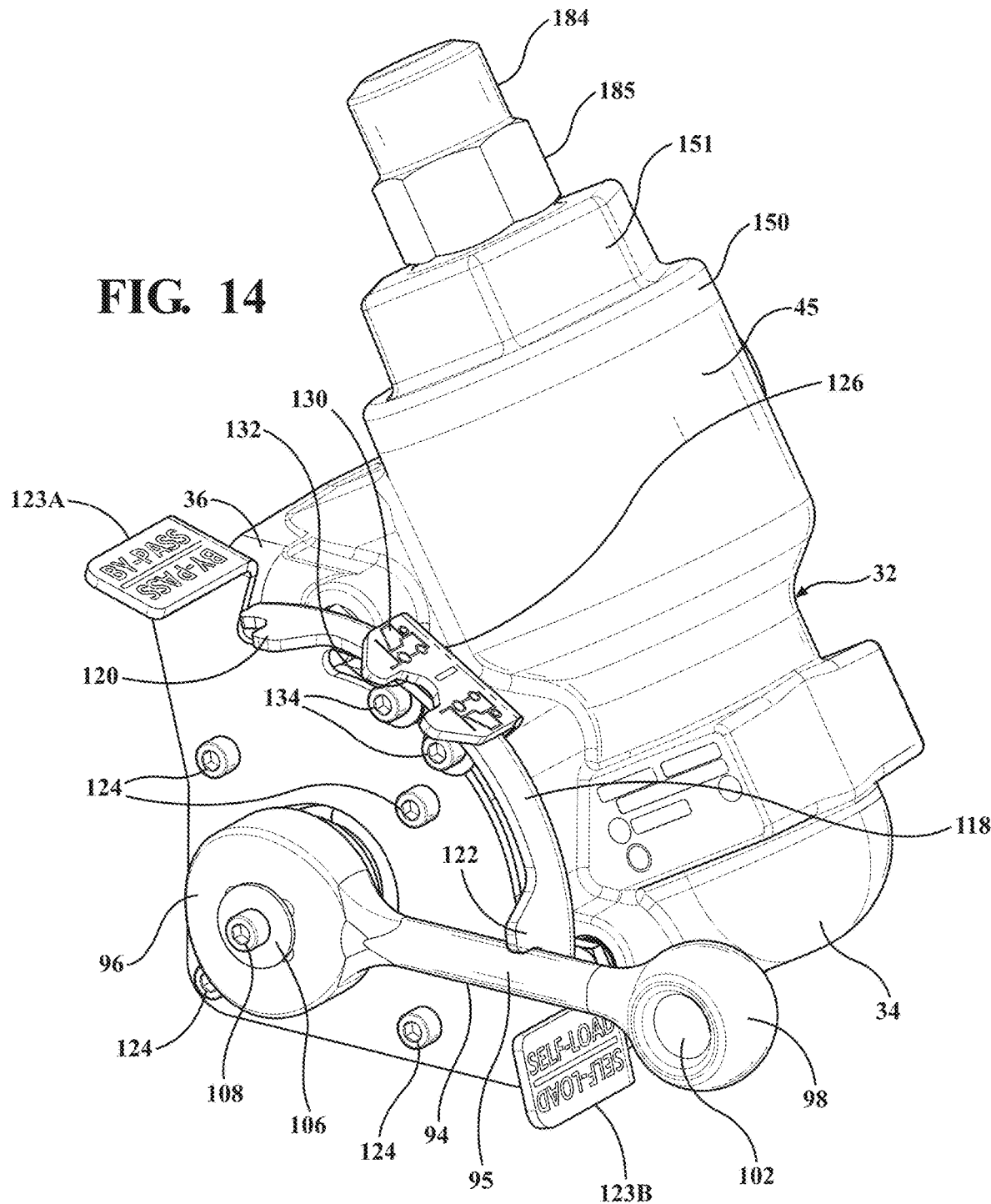
FIG. 14 is a perspective view of the bypass valve assembly of FIG. 1 illustrated in a third operational position.
Figure 15:
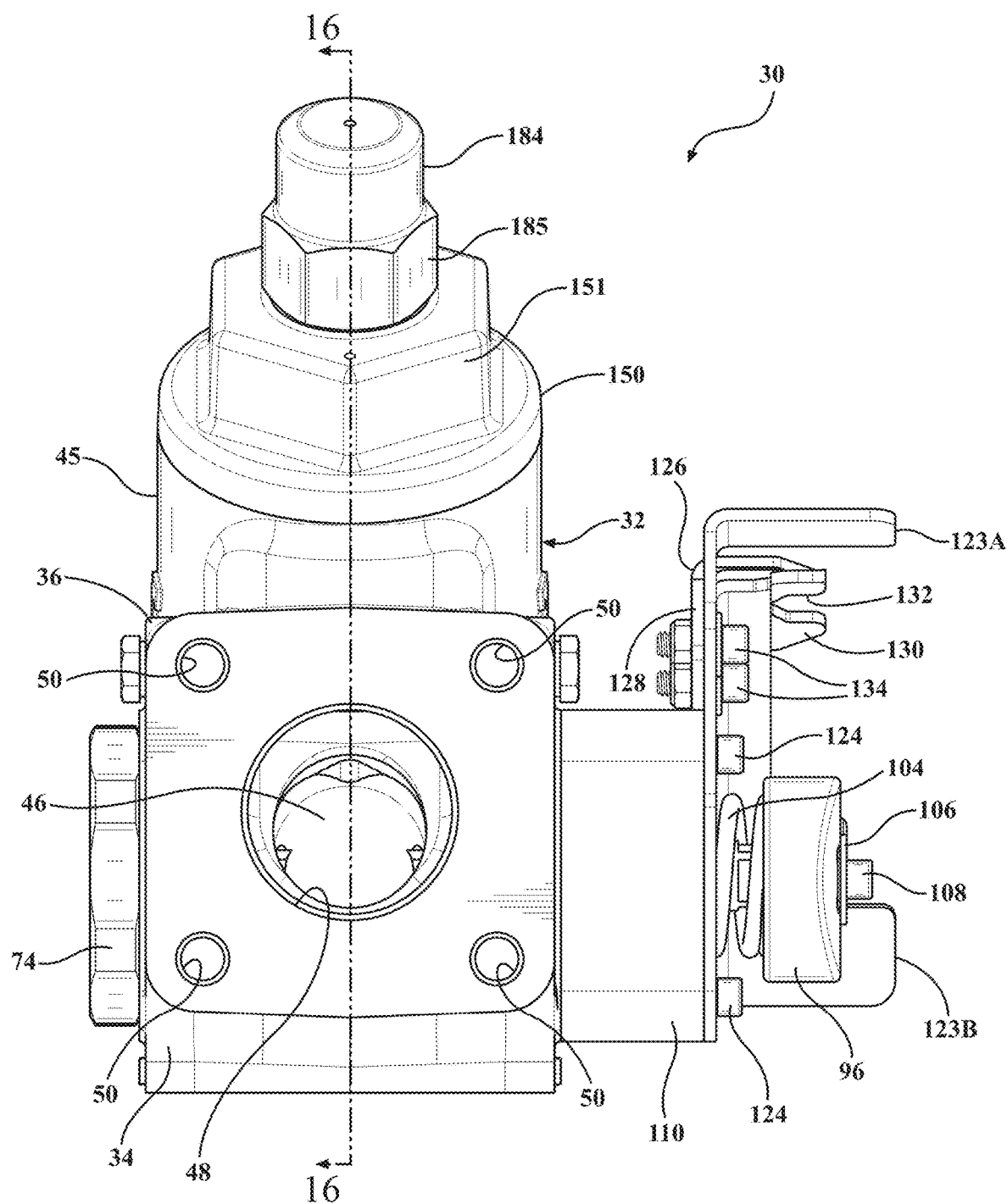
FIG. 15 is a front elevational view of the bypass valve assembly of FIG. 14.
Figure 16:
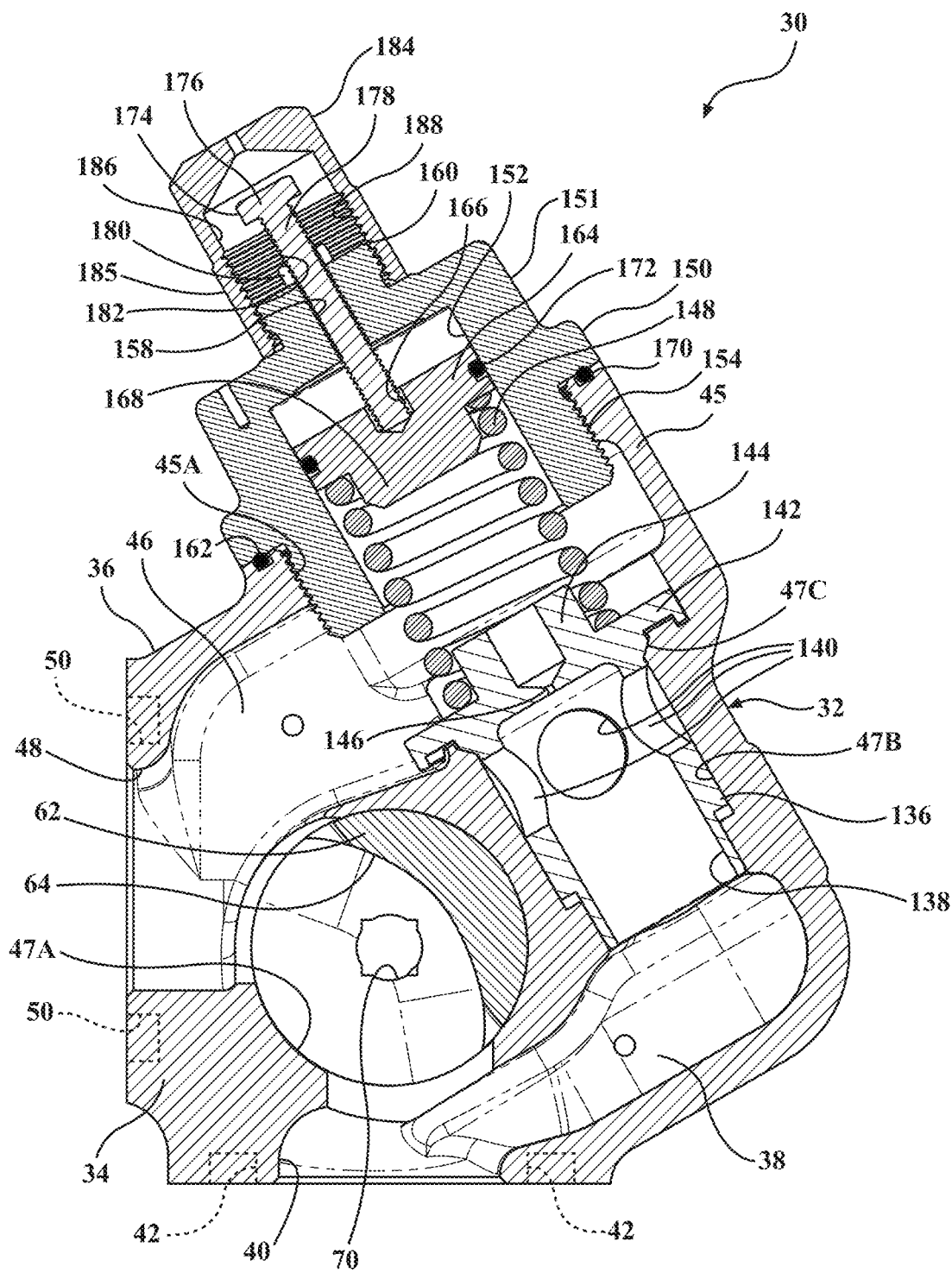
FIG. 16 is a sectional view taken along line 16-16 of FIG. 15.

Referring to FIGS. 14-16, the bypass valve assembly 30 is illustrated in a third or open position, enabling full flow of the liquid product from the inlet 40 to the outlet 48. The selector lever 94 is in a third predefined position of the lever plate 112 and the flow control valve 62 is actuated or rotated to a third position with the poppet 136 seated on the valve seat 47C. In this position, the flow control valve 62 is open to allow flow through the first flow passageway 47A, creating a high flow path with low flow restriction, such as 125 GPM LPG with 2 PSIG differential pressure, such as to enable self-loading or liquid withdrawal operations.

Figure 17:
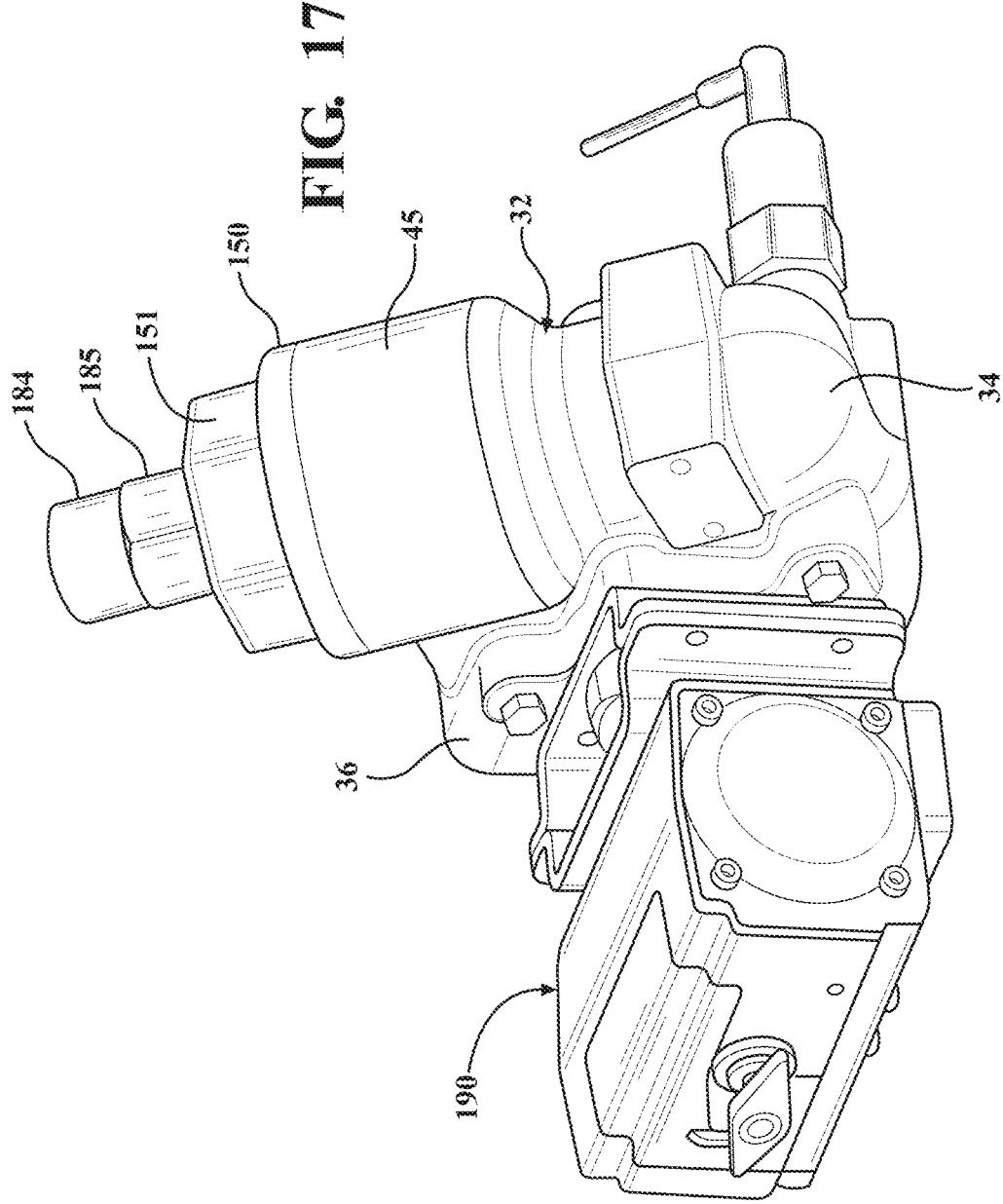
FIG. 17 is a perspective view of another embodiment of the bypass valve assembly of FIG. 1.
Figure 18:
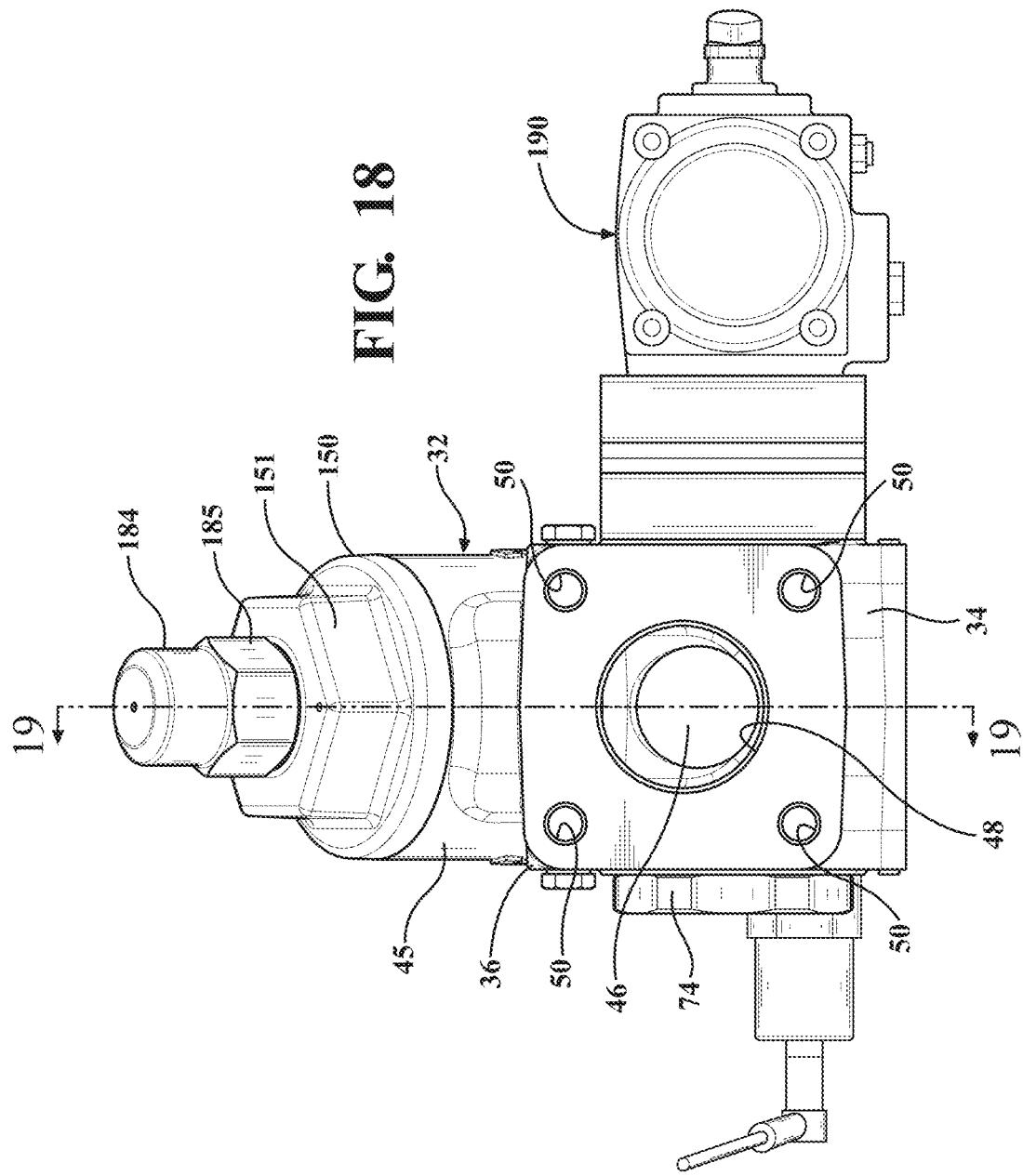
FIG. 18 is a front elevational view of the bypass valve assembly of FIG. 17.

Referring to FIGS. 17-19, another embodiment of the bypass valve assembly 30 of FIGS. 1-16 is shown. Like parts of the bypass valve assembly 30 have like reference numerals. In this embodiment, the bypass valve assembly 30 includes a rotary actuator, generally indicated at 190, coupled to the flow control valve 62 to position the flow control valve 62 to any desired position and corresponding flow. The rotary actuator 190 is connected to a source of power and may be controlled pneumatically or electronically such as by an electronic controller (not shown). It should be appreciated that, in this embodiment, the bypass valve assembly 30 may have an in-line construction with collinear inlet and outlet flanges. It should also be appreciated that the bypass valve assembly 30 has an automatically actuated configuration such that the rotary actuator 190 positions the flow control valve 62 to any desired position and corresponding flow.

Figure 20A:
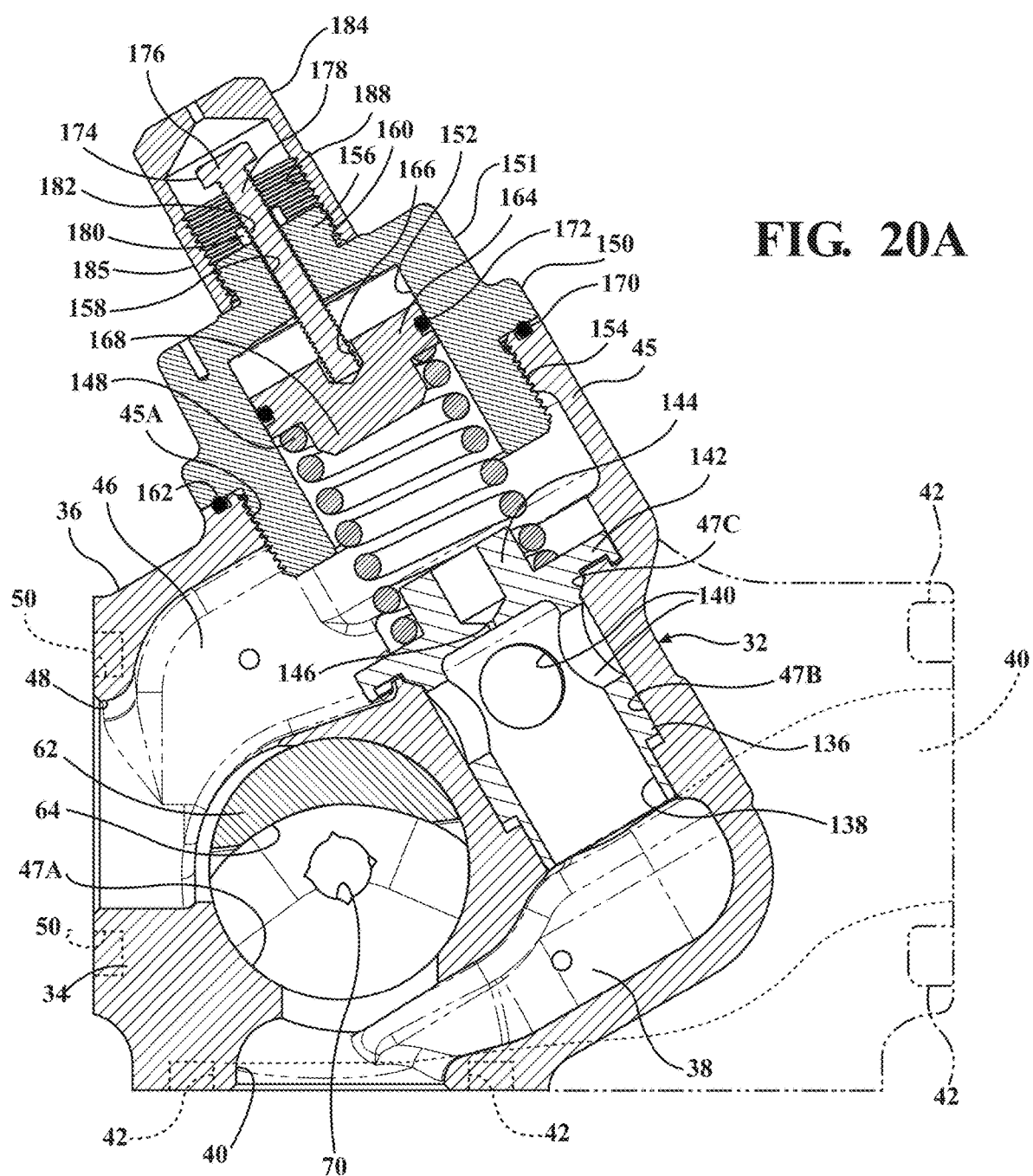
FIG. 20A is a sectional view illustrating an alternative in-line inlet and outlet configuration.
Figure 20B:
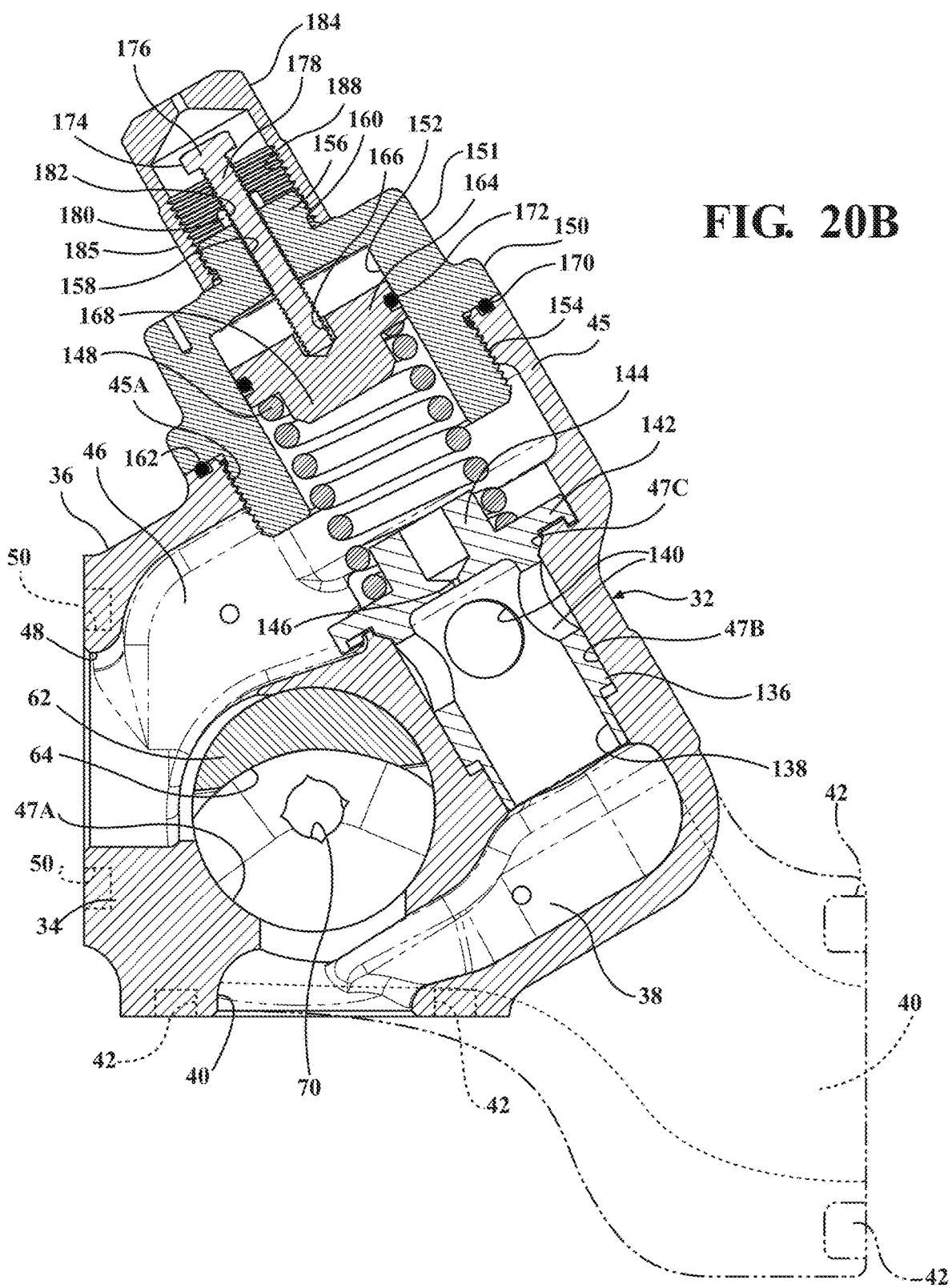
FIG. 20B is a sectional view illustrating an alternative axially offset inlet and outlet configuration.

Referring to FIGS. 20A and 20B, the housing 32 is shown with an inlet 40 and outlet 48 arranged so that the bypass valve assembly 30 can be connected in an elbow-type connection to the bypass inlet line 26 and the bypass outlet line 28, as shown in FIG. 1. However, alternative inlet and outlet configurations are possible. For example, as shown by hidden lines in FIG. 20A, the inlet 40 can be arranged in-line with the outlet 48 for axial connection along the same line as the outlet 48. Additionally, referring to FIG. 20B, the inlet 40 (again shown in hidden lines) can be arranged axially offset from the outlet 48 for offset connections.

Accordingly, the bypass valve assembly 30 is provided with an integrated flow control valve 62 for liquid propane and other fuel. In some embodiments, the bypass valve assembly 30 maintains inlet/outlet flange geometry of existing bypass valves, allowing the bypass valve assembly 30 to be a drop-in replacement for the existing fleet of bobtail trucks to be easily retrofitted to provide enhanced functionality.

Embodiments of the present invention have been described in an illustrative manner. It is to be understood that the terminology, which has been used, is intended to be in the nature of words of description rather than of limitation. For example, in some embodiments, and/or for certain applications, components described herein as being integral, unitary, and one-piece may be formed of multiple pieces and be connected in alternative ways to those described. Additionally, in some embodiments, and/or for certain applications, components described herein as being metal could be formed of alternative, suitable materials, such as plastic, and the like.

Many modifications and variations of the present invention are possible in light of the above teachings. Therefore, the present invention may be practiced other than as specifically described.

What is claimed is:

1. A bypass valve assembly comprising:
 a housing including an inlet, an outlet, a first flow passageway fluidly connected to said inlet and said outlet to allow flow of a liquid from said inlet to said outlet, and a second flow passageway fluidly connected to said inlet and said outlet and a valve seat disposed about said second flow passageway;
 a movable poppet disposed in said housing to engage said valve seat in a closed position and to disengage said valve seat in an open position when pressure of the liquid in said second flow passageway exceeds a preset value to allow flow of the liquid through said second flow passageway from said inlet to said outlet;
 a flow control valve disposed rotatably in said housing in said first flow passageway, said flow control valve including a fluid passage having a first section and a second section, said second section having an axial width greater than an axial width of said first section; and an actuator coupled to said flow control valve to move said flow control valve to control flow of the liquid between said inlet and said outlet when said poppet is engaged with said valve seat in said closed position.

2. A bypass valve assembly as set forth in claim 1 wherein said actuator comprises a rotary actuator operatively coupled to said flow control valve to automatically move said flow control valve.

3. A bypass valve assembly as set forth in claim 2 wherein said rotary actuator is an electronically controlled rotary actuator.

4. A bypass valve assembly as set forth in claim 2 wherein said rotary actuator is a pneumatically controlled rotary actuator.

5. A bypass valve assembly as set forth in claim 1 wherein said actuator comprises a selector lever operatively coupled to said flow control valve to manually move said flow control valve.

6. A bypass valve assembly as set forth in claim 5 including a lever plate coupled to said housing and cooperating with said selector lever to define a plurality of predefined positions for said selector lever.

7. A bypass valve assembly as set forth in claim 6 wherein one of said predefined positions defines a closed position, said flow control valve blocking flow of the liquid between said inlet and said outlet.

8. A bypass valve assembly as set forth in claim 6 wherein one of said predefined positions defines an open position, said flow control valve allowing full open flow of the liquid between said inlet and said outlet.

9. A bypass valve assembly as set forth in claim 6 wherein one of said predefined positions defines a variable position, said flow control valve allowing partial open flow of the liquid between said inlet and said outlet.

10. A bypass valve assembly as set forth in claim 6 including an intermediate adjustable plate coupled to said lever plate to cooperate with said selector lever to define one of said predefined positions as a variable position to allow said fluid passage of said flow control valve to be adjusted to correspond to a desired level of flow and be secured in said variable position relative to said lever plate.

11. A bypass valve assembly as set forth in claim 10 wherein said lever plate includes a slot extending therethrough and said intermediate adjustable plate being secured in said variable position along said slot.

12. A bypass valve assembly as set forth in claim 10 wherein said intermediate adjustable plate includes a recess therein to receive said selector lever in said variable position.

13. A bypass valve assembly comprising:
a housing including an inlet, an outlet, a flow passageway fluidly connected to said inlet and said outlet to allow flow of a liquid from said inlet to said outlet, and a valve seat disposed about said flow passageway between said inlet and said outlet;
a movable poppet disposed in said housing to engage said valve seat in a closed position and to disengage said valve seat in an open position when pressure of the liquid in said flow passageway exceeds a preset value to allow flow of the liquid through said flow passageway from said inlet to said outlet;
a flow control valve disposed rotatably in said housing between said inlet and said outlet, said flow control valve including a fluid passage having a first section and a second section, said second section having an axial width greater than an axial width of said first section;
a selector lever operatively coupled to said flow control valve to manually move said flow control valve;
a lever plate coupled to said housing and cooperating with said selector lever to define a plurality of predefined positions for said selector lever to control flow of the liquid between said inlet and said outlet when said poppet is engaged with said valve seat in said closed position; and
an intermediate adjustable plate coupled to said lever plate to receive said selector lever in said variable position to allow said fluid passage of said flow control valve to be adjusted to correspond to a desired level of flow and be secured in said variable position relative to said lever plate.

14. A bypass valve assembly as set forth in claim 13 wherein one of said predefined positions defines a closed position, said flow control valve blocking flow of the liquid between said inlet and said outlet.

15. A bypass valve assembly as set forth in claim 13 wherein one of said predefined positions defines an open position, said flow control valve allowing full open flow of the liquid between said inlet and said outlet.

16. A bypass valve assembly as set forth in claim 13 wherein one of said predefined positions defines said variable position, said flow control valve allowing partial open flow of the liquid between said inlet and said outlet.

17. A bypass valve assembly comprising:
a housing including an inlet, an outlet, a flow passageway fluidly connected to said inlet and said outlet to allow flow of a liquid from said inlet to said outlet, and a valve seat disposed about said flow passageway between said inlet and said outlet;
a movable poppet disposed in said housing to engage said valve seat in a closed position and to disengage said valve seat in an open position when pressure of the liquid in said flow passageway exceeds a preset value to allow flow of the liquid through said flow passageway from said inlet to said outlet;
a flow control valve rotatably disposed in said housing between said inlet and said outlet and fluidly communicating with said flow passageway, said flow control valve including a fluid passage having a first section and a second section, said second section having an axial width greater than an axial width of said first section; and
a rotary actuator coupled to said flow control valve to automatically move said flow control valve to control flow of the liquid between said inlet and said outlet when said poppet is engaged with said valve seat in said closed position.

18. A bypass valve assembly comprising:
a housing including an inlet, an outlet, a flow passageway fluidly connected to said inlet and said outlet to allow flow of a liquid from said inlet to said outlet, and a valve seat disposed about said flow passageway between said inlet and said outlet;
a movable poppet disposed in said housing to engage said valve seat in a closed position and to disengage said valve seat in an open position when pressure of the liquid in said flow passageway exceeds a preset value to allow flow of the liquid through said flow passageway from said inlet to said outlet;
a flow control valve rotatably disposed in said housing between said inlet and said outlet and fluidly communicating with said flow passageway, said flow control valve including a fluid passage having a first section and a second section, said second section having an axial width greater than an axial width of said first section; and a rotary actuator coupled to said flow control valve to move said flow control valve to control flow of the liquid between said inlet and said outlet when said poppet is engaged with said valve seat in said closed position, wherein said rotary actuator is an electronically controlled rotary actuator.

19. A bypass valve assembly comprising:

a housing including an inlet, an outlet, a flow passageway fluidly connected to said inlet and said outlet to allow flow of a liquid from said inlet to said outlet, and a valve seat disposed about said flow passageway between said inlet and said outlet;

a movable poppet disposed in said housing to engage said valve seat in a closed position and to disengage said valve seat in an open position when pressure of the liquid in said flow passageway exceeds a preset value to allow flow of the liquid through said flow passageway from said inlet to said outlet;

a flow control valve rotatably disposed in said housing between said inlet and said outlet and fluidly communicating with said flow passageway, said flow control valve including a fluid passage having a first section and a second section, said second section having an axial width greater than an axial width of said first section; and a rotary actuator coupled to said flow control valve to move said flow control valve to control flow of the liquid between said inlet and said outlet when said poppet is engaged with said valve seat in said closed position, wherein said rotary actuator is a pneumatically controlled rotary actuator.

* * * * *